(12) United States Patent
Akiyama et al.

(10) Patent No.: US 7,734,192 B2
(45) Date of Patent: Jun. 8, 2010

(54) CONTROL APPARATUS AND CONTROL METHOD FOR OPTICAL MODULATOR

(75) Inventors: Yuichi Akiyama, Kawasaki (JP); Hiroki Ooi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/219,546

(22) Filed: Jul. 23, 2008

(65) Prior Publication Data
US 2009/0034988 A1   Feb. 5, 2009

Related U.S. Application Data

(62) Division of application No. 10/793,097, filed on Mar. 5, 2004, now Pat. No. 7,418,211.

(30) Foreign Application Priority Data
Mar. 27, 2003   (JP) .................. 2003-088666

(51) Int. Cl.
H04B 10/04   (2006.01)
(52) U.S. Cl. .................................. 398/198
(58) Field of Classification Search ............... 398/198
See application file for complete search history.

(56) References Cited

U.S. PATENT DOCUMENTS

| 7,068,950 | B2 | 6/2006 | Sinsky |
| 7,092,643 | B2 * | 8/2006 | Kajiya et al. ............. 398/198 |
| 7,200,343 | B2 | 4/2007 | Ikeuchi |
| 2001/0007508 | A1 * | 7/2001 | Ooi et al. ................ 359/245 |
| 2001/0009469 | A1 | 7/2001 | Shimizu et al. |
| 2002/0005975 | A1 | 1/2002 | Nakamoto |
| 2002/0080817 | A1 | 6/2002 | Glingener et al. |
| 2002/0149824 | A1 | 10/2002 | Beaulieu et al. |

FOREIGN PATENT DOCUMENTS

| EP | 1 168 039 | 1/2002 |
| EP | 1 168 041 | 1/2002 |

(Continued)

OTHER PUBLICATIONS

European Search Report for corresponding EP Patent Application 04006226.7 dated Jun. 23, 2005.

(Continued)

*Primary Examiner*—Leslie Pascal
(74) *Attorney, Agent, or Firm*—Staas & Halsey LLP

(57) ABSTRACT

An object of the invention is to provide a control system in which the phase shift between drive signals of an optical modulator can be reliably detected and compensated by a simple configuration. To this end, a control apparatus of the invention, for an optical modulator generating a signal light of a CS-RZ modulation system or the like by two LN modulators connected in series, detects the phase shift between drive signals given to the former and latter stage LN modulators, or judges the phase shift between the drive signals based on intensity information of the electric spectrum of the signal light output from the optical modulator, to control the phases of the drive signals so as to minimize the phase shift. As a result, the phase shift between the drive signals can be reliably detected and compensated by an electric circuit with a simple configuration.

3 Claims, 28 Drawing Sheets

FOREIGN PATENT DOCUMENTS

| | | |
|---|---|---|
| JP | 03-251815 | 11/1991 |
| JP | 11-072761 | 3/1999 |
| JP | 2001-159748 | 6/2001 |
| JP | 2002-077053 | 3/2002 |
| JP | 2002-164850 | 6/2002 |
| JP | 2002-353896 | 12/2002 |
| JP | 2003-279912 | 10/2003 |

OTHER PUBLICATIONS

Y. Miyamoto, A. Hirano, K. Yonenaga, A. Sano, H. Toba, K. Murata and O. Mitomi, "320 Gbit/s (8X40 Gbit/s) WDM transmittsion over 367km with 120km repeater spacing using carrier-suppressed return-to-zero format", Electronics Letters Nov. 11, 1999, vol. 35, No. 23, pp. 2041-2042.

A. Hirano et al., Optical Society of America/Institute of Elecrical and Electcronics Engineers: "Performances of CSRZ-DPSK and RZ-DPSK in 43-Gbit/ch DWDM G652 single-mode-fiber transmission", Optical Fiber Communication Conference (OFC). Postconference Digest, Atlanta, GA, Mar. 23-28, 2003, vol. TOPS, vol. 86, Mar. 23, 2003, pp. 454-456, XP010680288.

Office Action issued in corresponding Japanese Patent Application No. 2003-088666, mailed on Dec. 18, 2007.

Office Action for parent U.S. Appl. No. 10/793,097; mailed Feb. 27, 2007.

Office Action for parent U.S. Appl. No. 10/793,097; mailed May 16, 2007.

Office Action for parent U.S. Appl. No. 10/793,097; mailed Nov. 26, 2007.

Office Action for parent U.S. Appl. No. 10/793,097; mailed Dec. 19, 2007.

Office Action for parent U.S. Appl. No. 10/793,097; mailed Apr. 21, 2008.

Notice of Allowance for parent U.S. Appl. No. 10/793,097; mailed May 9, 2008.

* cited by examiner

CHANGE IN ELECTRIC SPECTRUM OF CS-RZ SIGNAL LIGHT
DUE TO PHASE SHIFT BETWEEN DATA SIGNAL AND CLOCK SIGNAL

CHANGE IN OPTICAL WAVEFORM OF CS-RZ SIGNAL LIGHT
DUE TO PHASE SHIFT BETWEEN DATA SIGNAL AND CLOCK SIGNAL

CHANGE IN ELECTRIC SPECTRUM OF CS-RZ SIGNAL LIGHT DUE TO PHASE SHIFT BETWEEN CLOCK SIGNAL CLK1 AND CLOCK SIGNAL CLK2

CHANGE IN OPTICAL WAVEFORM OF CS-RZ SIGNAL LIGHT DUE TO PHASE DEVIATION BETWEEN CLOCK SIGNAL CLK1 AND CLOCK SIGNAL CLK2

CHANGE IN CS-RZ SIGNAL LIGHT DUE TO DEVIATION OF OPERATING POINT (a) 40Gb/s NRZ MODULATED SIGNAL LIGHT  (b) 40Gb/s CS-RZ MODULATED SIGEL LIGHT

FIG.29
RELATED ART
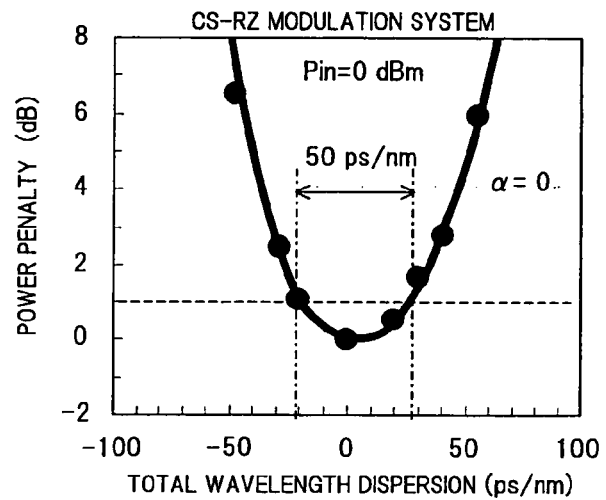
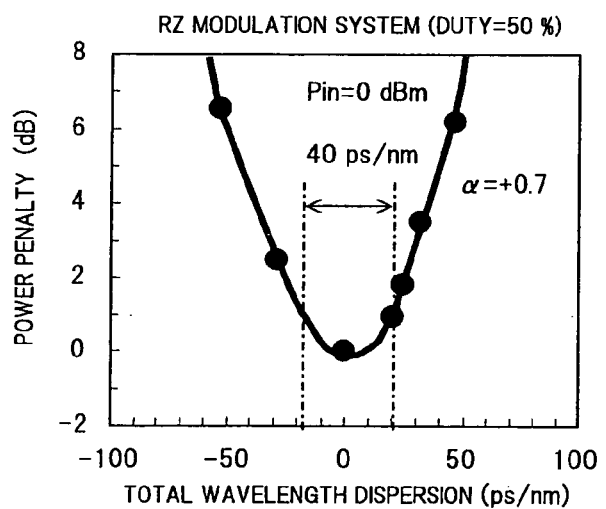
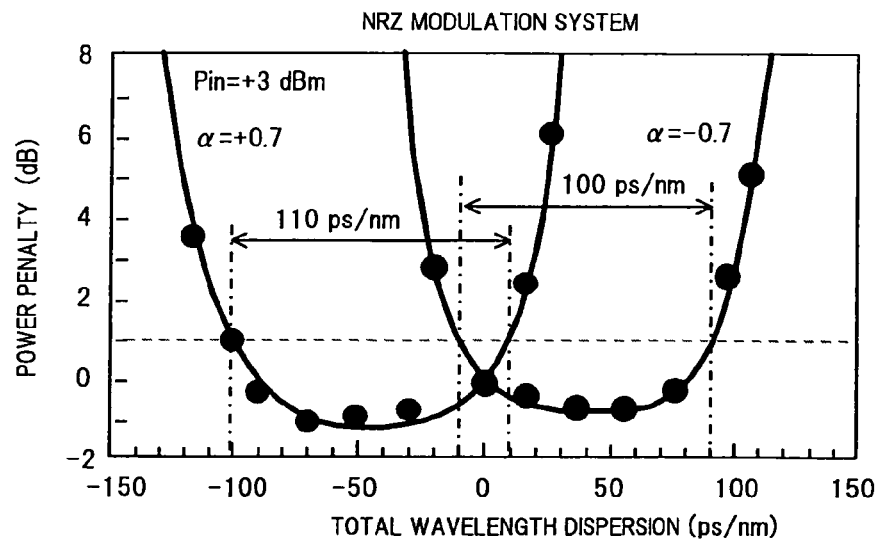

CONTROL APPARATUS AND CONTROL METHOD FOR OPTICAL MODULATOR

This application is a divisional application of U.S. patent application Ser. No. 10/793,097, filed Mar. 5, 2004, now U.S. Pat. No. 7,418,211 the disclosure of which is herein incorporated in its entirety by reference, which claims the priority benefit of Japanese Application No. 2003-088666, filed Mar. 27, 2003, the disclosure of which is herein incorporated in its entirety by reference.

BACKGROUND OF THE INVENTION

1. Field of the Invention

The present invention relates to a control technique for an optical modulator used in an optical communication, and particularly, relates to a control technique for compensating for the phase shift between a plurality of drive signals driving the optical modulator and the operating point deviation of the optical modulator.

2. Description of the Related Art

At present, a practical use of optical transmission system in which a transmission speed of optical signals is 10 Gb/s or the like, has bee started. However, due to a recent rapid increase of network utilization, the larger network capacity has been required, and a demand for ultra long distance has been increased.

In an optical transmission system in which a transmission speed is equal to or more than 10 Gb/s, the wavelength dispersion significantly affects waveforms, leading to a wider optical spectrum. As a result, a WDM transmission in which channel lights are arranged in high density becomes difficult Particularly, in an optical transmission system of 40 Gb/s, the wavelength dispersion is one of factors limiting a transmission distance.

As one means for solving the above described problems, a dispersion compensation technique for accurately measuring a dispersion value of an optical transmission path to compensate for the dispersion value has been studied (refer to Japanese Unexamined Patent Publication No. 11-72761 and Japanese Unexamined Patent Publication No. 2002-077053). Moreover, for realizing the above described optical transmission system, it is essential to develop a modulation system in which the dispersion tolerance is as large as possible. Specifically, a modulation system is required, in which an excellent optical signal to noise ratio can be secured for a long distance optical transmission system, that is to say, a modulation system is required, which is strong in the self phase modulation (SPM) effect and can increase an upper limit of optical input power into the optical transmission path. Furthermore, a modulation system is required, in which the optical spectrum is narrow, to enable a high density WDM optical transmission for the large capacity.

Recently, as new modulation systems, a Carrier-Suppressed Return-to-Zero (hereunder, CS-RZ) modulation system and the like have been studied (refer to Y. Miyamoto et. al., "320 Gbit/s (8×40 Gbit/s) WDM transmission over 367-km zero-dispersion-flattened line with 120-km repeater spacing using carrier-suppressed return-to-zero pulse format", OAA' 99 PD, PdP4). Since this CS-RZ modulation system has an advantage that, as described later, the optical spectrum width becomes ⅔ times compared to the Return-to-Zero (RZ) modulation system, the wavelength dispersion tolerance is large, which enables a high density channel light arrangement in the WDM. Furthermore, since the waveform deterioration due to the self phase modulation effect is small, it becomes possible to secure the optical signal to noise ratio for the long distance transmission.

FIG. 25 is a diagram showing a basic configuration for generating a CS-RZ modulating signal of 40 Gb/s.

In FIG. 25, a light source 100 generates a continuous light The continuous light output from the light source 100 is sequentially input to two $LiNbO_3$ modulators (hereunder, LN modulators) 110 and 120 connected in series, to be modulated.

The former stage LN modulator 110 is applied with, at a signal electrode thereof (not shown in the figure), for example, a data signal with bit rate of 40 Gb/s, which is generated in a data signal generating section 111 and corresponds to the NRZ modulation system, as a drive signal. As a result, the former stage LN modulator 110 modulates the continuous light from the light source 100 in accordance with the data signal, and outputs an NRZ signal light of 40 Gb/s having a waveform as exemplified in (a) of FIG. 26 to the latter stage LN modulator 120.

For the latter stage LN modulator 120, for example, a Mach-Zehnder (MZ) modulator or the like having two signal electrodes is used. The latter stage LN modulator 120 is applied with, at the respective signal electrodes thereof, a first drive signal and a second drive signal generated based on a clock signal having a frequency of ½ the bit rate of the data signal. As a result, the latter stage LN modulator further modulates the NRZ signal light from the former stage LN modulator 110, and outputs a CS-RZ signal light of 40 Gb/s having a waveform as exemplified in (b) of FIG. 26. Here, a clock signal having a waveform of a sine wave and the like with frequency 20 GHz, is generated in a clock signal generating section 121. The clock signal is branched into two by a branching device 124, and then adjusted by phase shifters 125A and 125B so that a phase difference between branched signals reaches approximately 180°. Furthermore, respective amplitudes of the branched signals are adjusted by amplifiers 126A and 126B, to become first and second drive signals to be applied to the respective signal electrodes of the LN modulator 120.

Moreover, a part of the clock signal generated in the clock signal generating section 121 is branched by a branching device 122 and transmitted to the data signal generating section 111 so that phases of the data signal and clock signal are synchronized, and at the same time, the phase of the clock signal is adjusted by a phase shifter 123 so that a phase difference between the respective signals is controlled.

Here, the theory of how the CS-RZ signal light of 40 Gb/s is generated is briefly described using an optical intensity characteristic of an LN modulator to a drive voltage, shown in FIG. 27.

Generally, in the case where a signal light corresponding to the NRZ modulation system or the RZ modulation system is generated using an optical modulator, an optical intensity characteristic of which to a drive voltage is changed periodically, a drive voltage corresponding to adjacent "top, bottom" or "bottom, top" of the above optical intensity characteristic (hereunder, this drive voltage is Vπ) is given to the optical modulator, so as to perform the modulation. Here, "top" of the optical intensity characteristic denotes emission peak points and "bottom" denotes extinction peak points.

On the other hand, in the case where a signal light corresponding to the CS-RZ modulation system is generated, the signal light of 40 Gb/s modulated by the former stage LN modulator 110 shown in FIG. 25 in accordance with the data signal, is further modulated by the latter stage LN modulator 120 in accordance with the clock signal of 20 GHz having the frequency of ½ the bit rate of the data signal. The latter stage LN modulator 120, as shown in the left of FIG. 27, is applied with a drive voltage corresponding to "top, bottom, top" of the optical intensity characteristic to the drive voltage (hereunder, this drive voltage is 2Vπ). This light modulation is performed by corresponding the respective levels of −1, 0, 1 of the clock signal to the respective conditions of ON, OFF, ON of the light. As a result, the CS-RZ signal light generated becomes a binary optical waveform as shown at the top right of FIG. 27. For the signal light in this CS-RZ modulation system, since optical phases of respective bits thereof have a value of 0 or π, for example, as shown in a calculation result of the optical spectrum at the bottom right of FIG. 27, a carrier component of the optical spectrum is suppressed.

For the signal light of the CS-RZ modulation system generated as described above, for example, as in the respective experimental results of the optical spectrum and optical waveform shown in FIG. 28, an optical waveform of the form approximately the same as the optical waveform of the RZ modulation system can be obtained, and the optical spectrum width becomes narrower than that of the RZ modulation system. Moreover, as in the experimental results related to the wavelength dispersion tolerance shown in FIG. 29, a range of total wavelength dispersion where a value of power penalty becomes equal to or less than 1 dB, is approximately 40 ps/nm in the RZ modulation system, whereas in the CS-RZ modulation system, the range is approximately 50 ps/nm. Accordingly, it is understood that, for the signal light of the CS-RZ modulation system, the dispersion tolerance is enlarged compared to the signal light of the RZ modulation system.

Incidentally, the signal light corresponding to the CS-RZ modulation system has the above described advantages, but there are disadvantages in that; the phase between the first and second drive signals to be given to the latter stage optical modulator which is driven based on the clock signal, should be precisely adjusted, and the phase between the above described clock signal and the data signal used for driving the former stage optical modulator should also be precisely adjusted. Furthermore, since there is a possibility that the phase shift occurs due to environmental changes such as temperature changes, it becomes essential to detect a phase change in each signal during the system operation, to perform a feedback control.

Here, the present applicant has proposed a system, for example as shown in FIG. 30, for monitoring the optical spectrum of signal light output from an optical modulator by a monitoring section 130, and then based on an intensity variation of a specific frequency component in the optical spectrum, feedback controlling the above described phase shift between drive signals by a control circuit 140 (refer to Japanese Patent Application No. 2002-087017). According to this prior invention, by focusing on the intensity variation of the specific frequency component of the output optical spectrum, the phase shift between signals of the drive system can be reliably detected, and it becomes possible to control the phase difference between drive signals so that an optimum drive condition can be obtained stably.

However, the control system of the optical modulator according to this prior invention has the following problems. That is, in the above described control method, the specific frequency component of the output optical spectrum is extracted using a narrow-band optical filter 132, to monitor the intensity variation. However, at this time, there is a problem that, unless the specific frequency component is extracted using an optical filter with a sufficiently narrow bandwidth of transmission band, the monitoring accuracy of the intensity variation is reduced. Generally, an optical filter having a sufficiently narrow bandwidth is not easily realized. Therefore, due to the reduction of monitoring accuracy of the intensity variation as described above, there is a possibility that it becomes difficult to feedback control stably the phase difference between the drive signals. Furthermore, for the control system of the prior invention, another problem is that a control corresponding to the operating point variation of the optical modulator has not yet been realized.

SUMMARY OF THE INVENTION

The present invention has been accomplished in view of the above problems, and has a first object to provide a control system capable of reliably detecting the phase shift between drive signals of an optical modulator to compensate for the deviation with a simple configuration. Moreover, the present invention has a second object to provide a control system capable of compensating for the operating point deviation of an optical modulator driven with the voltage amplitude of 2Vπ.

An optical modulator which is an object to be controlled by a control apparatus according to the present invention for achieving the above first object, comprises: a first modulation section and a second modulation section connected in series; and a drive section that gives drive signals, phases of which are synchronized, to the first and second modulation sections, respectively. The second modulation section including a part for branching an optical waveguide into a first branch optical waveguide and a second branch optical waveguide, and a part for combining the first and second branch optical waveguides, utilizes a first electrode and a second electrode respectively provided in the first and second branch optical waveguides to control refractive indexes of the first and second branch optical waveguides, and obtains a periodic optical intensity characteristic according to a difference between the refractive indexes. Moreover, the drive section is capable of giving a drive signal to at least one of the first and second electrodes so that the second modulation section performs a modulating operation corresponding to one period of the optical intensity characteristic thereof. For such an optical modulator, one aspect of the present control apparatus comprises: a phase shift detection section that compares phases of the respective drive signals given to the first and second modulation sections to detect the phase shift, and a control section that controls the drive section so as to minimize the phase shift detected in the phase shift detection section. In such a constitution, the phase shift between respective drive signals given to the first and second modulators from the drive section, is detected in the phase shift detection section, and based on the detection result, the drive section is controlled so that the phases of the respective drive signals are adjusted. As a result, it becomes possible to detect the phase shift between the drive signals given to the first and second modulators, to compensate for the phase shift by an electric circuit with a simple configuration.

Furthermore, another aspect of the control apparatus for the optical modulator comprises: an output monitoring section that photo-electric converts a signal light output from the optical modulator to acquire the electric spectrum, and detects information related to the intensity of the electric spectrum; and a control section that judges the phase shift between the drive signals of the optical modulator based on the intensity information detected in the output monitoring section, and controls the drive section so as to minimize the phase shift. In such a constitution, the phase shift between the drive signals is judged based on the intensity information of the electric spectrum of the output light from the optical modulator, and based on the judgment result, the drive section is controlled so that the phases of the drive signals are adjusted. As a result, it becomes possible to detect the phase shift between the respective drive signals given to the optical modulator, to compensate for the phase shift by an electric circuit with a simple configuration.

The optical modulator which is an object to be controlled by the control apparatus according to the present invention for achieving the above second object comprises: a modulation section including a part for branching an optical waveguide into a first branch optical waveguide and a second branch optical waveguide, and a part for combining the first and second branch optical waveguides, and having a constitution of utilizing a first electrode and a second electrode respectively provided in the first and second branch optical waveguides to control refractive indexes of the first and second branch optical waveguides, and obtaining a periodic optical intensity characteristic according to a difference between the refractive indexes; a drive section that gives a drive signal to at least one of the first and second electrodes so that the modulation section performs a modulating operation corresponding to one period of the optical intensity characteristic thereof; and a bias supply section that supplies a DC bias to the modulation section to adjust an operating point. For such an optical modulator, the present control apparatus comprises: an output monitoring section that detects a change in the signal light output from the optical modulation section; and a control section that judges the operating point deviation of the modulation section based on the detection result in the output monitoring section, and controls the bias supply section so as to minimize the operating point deviation. In such a constitution, the operating point deviation is judged based on the change in the output light from the optical modulator, and based on the judgment result, the bias supply section is controlled so that the DC bias given to the modulation section is adjusted. As a result it becomes possible to compensate for the operating point deviation of the optical modulator driven by voltage amplitude of $2V\pi$.

Other objects, features and advantages of the present invention will become apparent from the following description of embodiments, in conjunction with the appended drawings.

BRIEF DESCRIPTION OF THE DRAWINGS

FIG. 29 is a diagram showing experimental results for explaining a characteristic related to wavelength dispersion tolerance for CS-RZ signal light.

DETAILED DESCRIPTION OF THE INVENTION

Figure 1:
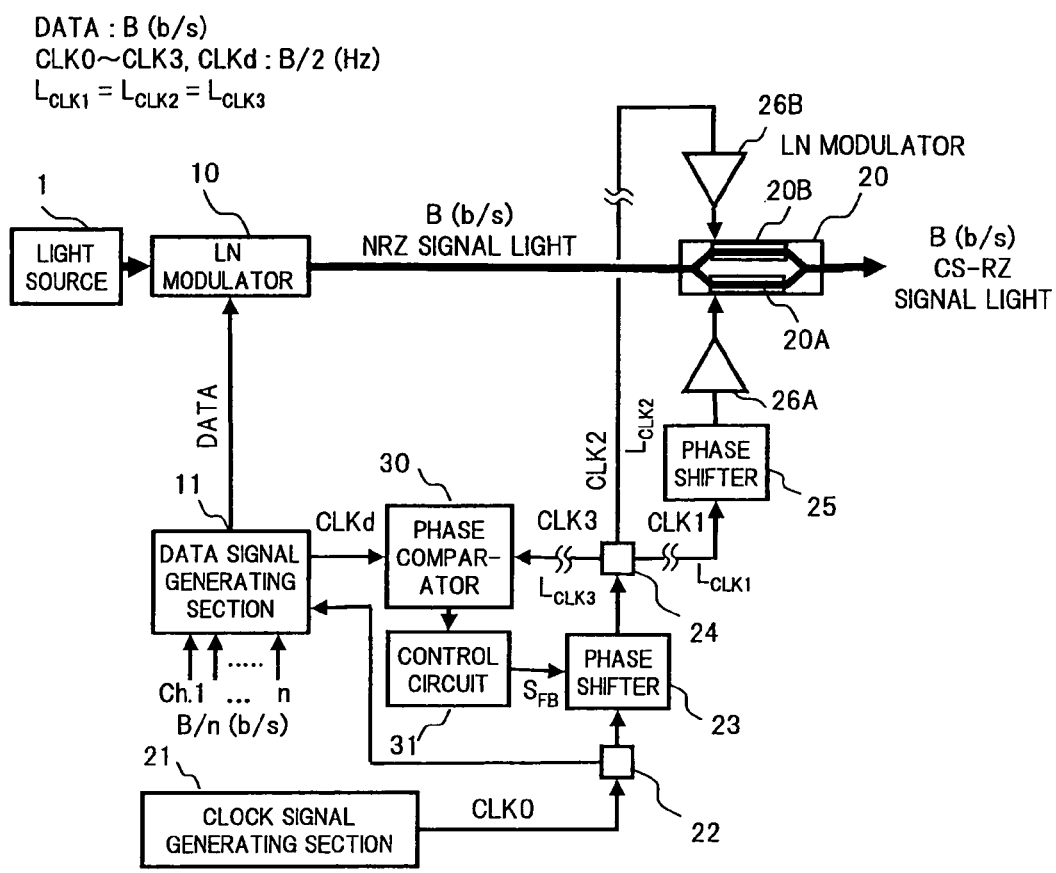
FIG. 1 is a block diagram showing a configuration of a first embodiment of the present invention.

Hereunder is a description of embodiments of the present invention based on drawings. Throughout the drawings, the same reference numerals denote the same or corresponding parts.

FIG. 1 is a block diagram showing a configuration of a first embodiment of a control apparatus for an optical modulator according to the present invention.

In FIG. 1, an optical modulator to which the control apparatus of the first embodiment is applied, sequentially inputs, for example, a continuous light generated by a light source 1 to LN modulators 10 and 20 connected in series serving as first and second optical modulators, to modulate the input light, and outputs a signal light of a CS-RZ modulation system. For this optical modulator, the present control apparatus comprises: a phase comparator 30 serving as a phase shift detection section that detects the phase shift between a drive signal given to the former stage LN modulator 10 and a drive signal given to the latter stage LN modulator 20; and a control circuit 31 serving as a control section that controls a phase shifter 23 so that the phase shift detected by the phase comparator 30 is minimized, and optimizes relative phases of the respective drive signals. Hereunder is a specific description of the components.

The former stage LN modulator 10 is a typical optical modulator configured using a lithium niobate (LiNbO$_3$:LN) substrate. This former stage LN modulator 10 is driven in accordance with, for example, a data signal DATA (for example, a 40 Gb/s data signal) which is generated in a data signal generating section 11 and has a bit rate of B (b/s) corresponding to the NRZ modulation system, to modify the continuous light from the light source 1 to output an NRZ signal light of B (b/s) to the latter stage LN modulator 20.

In the above data signal generating section 11, based on a data signal having a bit rate of B/n (b/s) corresponding to a plurality of (here, n) channels given from the outside, a data signal DATA of B/n (b/s) corresponding to the NRZ modulation system is generated, and the data signal DATA is given to the LN modulator 10, and at the same time, here, a clock signal CLKd having a frequency of B/n (Hz) and generated by extracting a clock component from the data signal DATA of B/n (b/s), is output to the phase comparator 30.

The latter stage LN modulator 20 is a well-known Mach-Zehnder optical modulator configured using the lithium niobate substrate. This LN modulator 20, includes, specifically; a part for branching an optical waveguide into a first optical waveguide and a second optical waveguide, and a part for combining the first and second optical waveguides, and utilizes a first electrode 20A and a second electrode 20B respectively provided in the first and second optical waveguides, to control refractive indexes of the first and second optical waveguides so that a periodic optical intensity characteristic corresponding to a difference between the refractive indexes is obtained. Here, an example is shown where the LN substrate is used for the former stage and latter stage modulators. However, the substrate material is not limited thereto, and each of the former stage and latter stage modulators may be configured using a substrate consisting of well-known material having an electro-optic effect.

Figure 27:
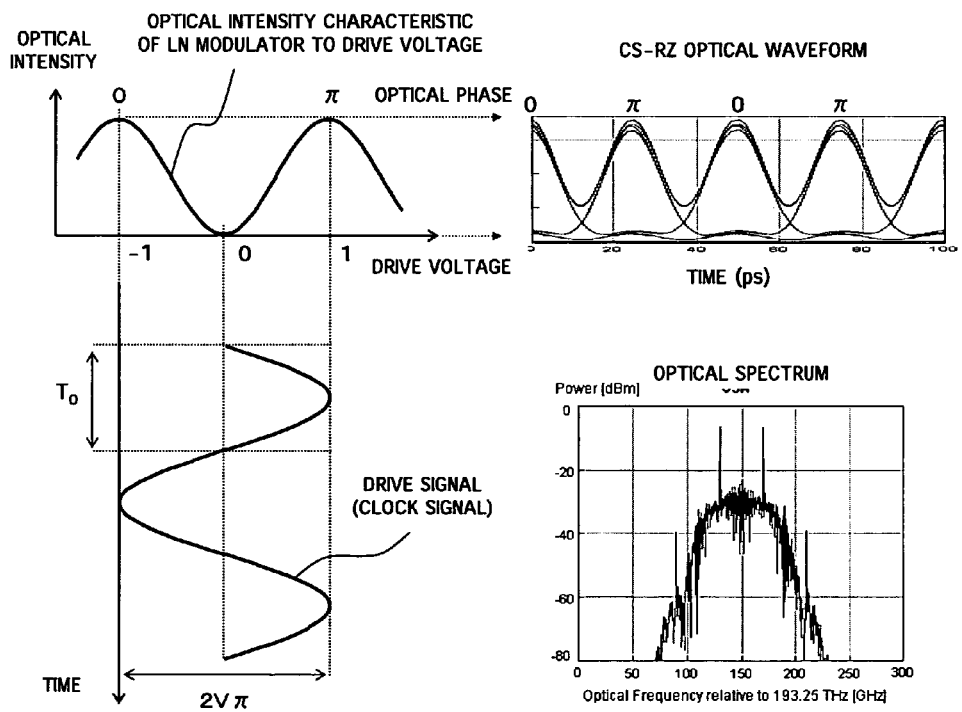
FIG. 27 is a diagram for explaining the theory of how CS-RZ signal light is generated.
Figure 28:
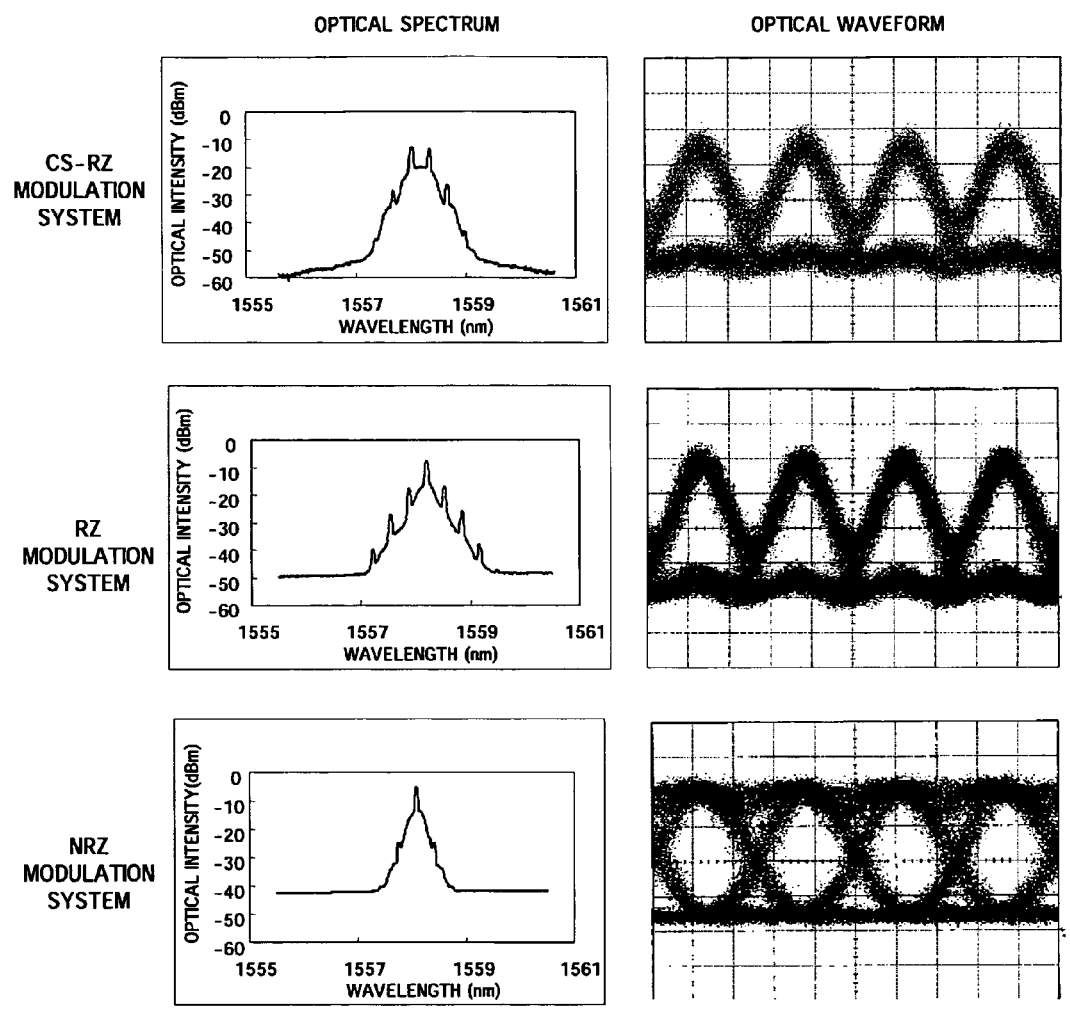
FIG. 28 is a diagram showing experimental results for explaining characteristics related to the optical spectrum and optical waveform for CS-RZ signal light.
Figure 30:
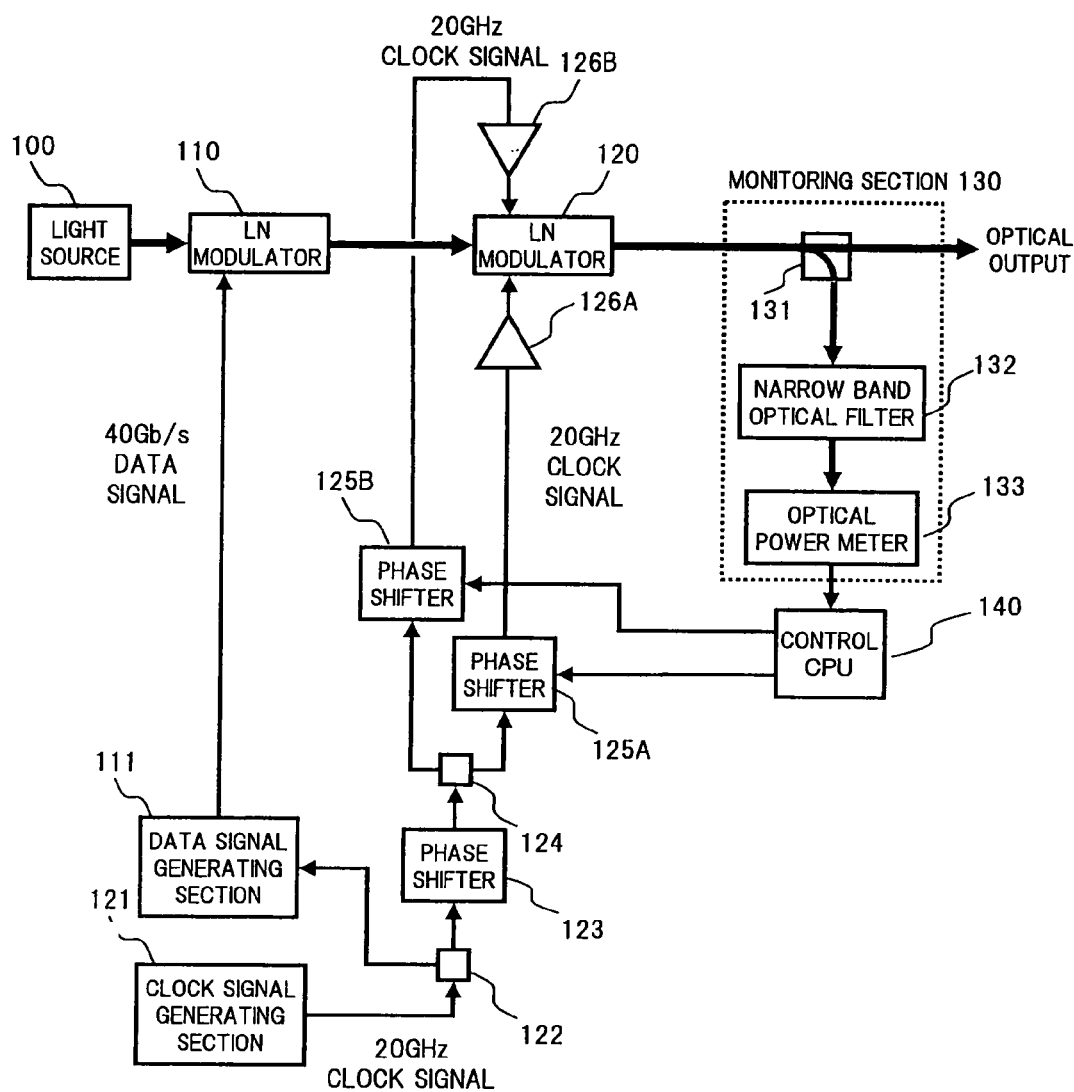
FIG. 30 is a block diagram showing a control apparatus for an optical modulator according to a prior invention.

To the respective electrodes 20A and 20B of the LN modulator 20, clock signals CLK1 and CLK2 (for example, 20 GHz clock signals), having a frequency corresponding to ½ the bit rate of the data signal generated in the data signal generating section 11, that is, a frequency of B/2 (Hz), are applied as drive signals. A phase difference between the respective clock signals CLK1 and CLK2 of B/2 (Hz) is adjusted by a phase shifter 25 and also the amplitudes of the respective clock signals are adjusted by amplifiers 26A and 26B, so that a potential difference between the respective electrodes 20A and 20B for when the clock signals CLK1 and CLK2 are given to the LN modulator 20, corresponds to one period of the periodic optical intensity characteristic of the LN modulator 20 (refer to FIG. 27). The latter stage LN modulator 20 driven in accordance with such respective clock signals CLK1 and CLK2, further modulates the NRZ signal light from the former stage LN modulator 10, to output a CS-RZ signal light of B (b/s).

A clock signal generating section 21 generates, for example, a clock signal CLK0 of B/2 (Hz) having a waveform of a sine wave or the like. This clock signal CLK0 of B/2 (Hz) is branched into two by a branching device 22 to be sent respectively to the data signal generating section 11 and the phase shifter 23. The signal sent from the branching device 22 to the data signal generating section 11 is used as a synchronous signal of the data signal DATA of B (b/s) generated by the data signal generating section 11.

The phase shifter 23, as described later, adjusts a phase of the clock signal CLK0 sent from the branching device 22 in accordance with a control signal $S_{FB}$ output from the control circuit 31. As the phase shifter 23, for example, it is possible to use a variable-length coaxial tube, a voltage controlled device or the like. The clock signal CLK0 of B/2 (Hz) that has been phase adjusted by the phase shifter 23, is branched into three clock signals CLK1, CLK2 and CLK3 by a branching device 24, to be sent respectively to the phase shifter 25, the amplifier 26B and the phase comparator 30.

The phase shifter 25, here, adjusts a phase of the clock signal CLK1 sent from the branching device 24, in order to adjust the phase difference between the drive signals respectively given to the electrodes 20A and 20B of the latter stage LN modulator 20. As the phase shifter 25, for example, it is also possible to use a variable-length coaxial tube, a voltage controlled device or the like. The clock signal CLK1 that has been phase adjusted by the phase shifter 25, is given to the first electrode 20A of the LN modulator 20 after its amplitude is adjusted to a required level by the amplifier 26A. On the other hand, the clock signal CLK2 that has been branched by the branching device 24 is here sent to the amplifier 26B without passing through any phase shifter, to be given to the second electrode 20B of the LN modulator 20 after its amplitude is adjusted to a required level by the amplifier 26B.

Here, the phase shifter 25 is provided only on the clock signal CLK1 side. However, also on the clock signal CLK2 side, a phase shifter may also be provided between the branching device 24 and the amplifier 26B, so that the phase adjustment is performed on both the clock signals CLK1 and CLK2.

The phase comparator 30 compares between a phase of a clock signal CLKd of B/2 (Hz) output from the data generating section 11 and a phase of the clock signal CLK3 of B/2 (Hz) branched by the branching device 24, and detects the phase shift between the respective clock signals CLKd and CLK3, to output a signal indicating the detection result to the control circuit 31. This phase comparator 30 is arranged so that a physical length $L_{CLK3}$ of a signal line which propagates the clock signal CLK3 between itself and the branching device 24 becomes the same as respective physical lengths $L_{CLK1}$ and $L_{CLK2}$ of signal lines which respectively propagates the clock signal CLK1 between the branching device 24 and the electrode 20A, and the clock signal CLK2 between the branching device 24 and the electrode 20B, of the LN modulator 20 ($L_{CLK1}=L_{CLK2}=L_{CLK3}$). In this manner, the physical lengths $L_{CLK1}$ to $L_{CLK3}$ of the respective signal lines are set to be the same. Consequently, even if the physical lengths $L_{CLK1}$ to $L_{CLK3}$ of the respective signal lines are changed due to a temperature change or the like, there is no difference between changes in the respective clock signals. As a result, it becomes possible to compare, with high accuracy, phases between the data signal and the clock signal, even though the clock signal CLK3 for monitoring is used.

The control circuit 31 generates a control signal $S_{FB}$, according to an output signal from the phase comparator 30, for feedback controlling a phase adjustment amount in the phase shifter 23 so that the phase shift between the clock signals CLKd and CLK3 is minimized.

In the optical modulator to which the control apparatus of the above configuration is applied, the continuous light from the light source 1 is input to the former stage LN modulator

10. The data signal DATA of B (b/s) generated by the data signal generating section 11 has been given to the LN modulator 10 as the drive signal. The continuous light input to the LN modulator 10 is modulated in accordance with the data signal DATA to become the NRZ signal light of B (b/s), and is output from the former stage LN modulator 10, to be sent to the latter stage LN modulator 20.

In the latter stage LN modulator 20, the clock signals CLK1 and CLK2 obtained by phase adjusting the clock signal CLK0 of B/2 (Hz) generated by the clock signal generating section 21 by the phase shifter 23 and then branching the phase adjusted clock signal CLK0 into the clock signals CLK1 and CLK2 by the branching device 24, and further adjusting the phases and amplitudes thereof by the phase shifter 25, and the amplifiers 26A and 26B, have been respectively given to the first and the second electrodes 20A and 20B as the drive signals. At this time, phase adjustment on the clock signal CLK0 in the phase shifter 23 is feedback controlled in accordance with the control signal $S_{FB}$ output from the control circuit 31.

In this feedback control, specifically, the phase adjustment amount in the phase shifter 23 is optimized so that the phase shift detected by the phase comparator 30, that is, the phase shift between the clock signal CLKd of B/2 (Hz) extracted from the data signal DATA of B (b/s) driving the former stage LN modulator 10 and the clock signal CLK3 equivalent to the clock signals CLK1 and CLK2 of B/2 (Hz) driving the latter stage LN modulator 20, is minimized and finally becomes approximately zero, to automatically compensate for the phase shift between the data signal DATA, and the clock signals CLK1 and CLK2.

For the clock signals CLK1 and CLK2 of B/2 (Hz) in which the phase shift between the data signal DATA of B (b/s) is adjusted by the above feedback control, the phase difference therebetween is further adjusted by the phase shifter 25 so that the potential difference between the respective electrodes 20A and 20B for when the clock signals CLK1 and CLK2 are sent to the latter stage LN modulator 20 corresponds to one period of the periodic optical intensity characteristic of the LN modulator 20, and the amplitudes thereof are adjusted by the amplifiers 26A and 26B. In the LN modulator 20 where the clock signals CLK1 and CLK2 adjusted in these manner are given to the respective electrodes as the drive signals, the NRZ signal light from the former stage LN modulator 10 is modulated in accordance with the clock signal of B/2 (Hz), and the CS-RZ signal light of B (b/s) in which the waveform deterioration due to the phase shift between the data signal DATA, and the clock signals CLK1 and CLK2 has been suppressed, is output to the outside.

As a specific operation mode of such an optical modulator, for example, at the time of system introduction, the phase adjustment amounts of the respective phase shifters 23 and 25 are set to values at which output waveforms are optimized by manual operation or the like. Then, in this state, the feedback control by the phase comparator 30 and the control circuit 31 is started. Thus, since the phase shift between the data signal DATA, and the clock signals CLK1 and CLK2, occurring due to the temperature change or the like when the system is operated, is reliably detected, it becomes possible to automatically compensate for the phase shift.

Thus, according to the control apparatus for the optical modulator of the first embodiment, the phase shift between the clock signal CLKd of B/n (Hz) extracted from the data signal DATA of B/n (b/s) driving the former stage LN modulator 10 and the clock signal CLK3 equivalent to the clock signals CLK1 and CLK2 of B/2 (Hz) driving the latter stage LN modulator 20, is detected, and then based on the detection result, the phase shifter 23 is feedback controlled. Consequently, differently from the above described prior invention, without monitoring the optical spectrum of the signal light output from the latter stage LN modulator 20, it becomes possible to reliably and automatically compensate for the phase shift between the data signal DATA, and the clock signals CLK1 and CLK2 by only an electric circuit with a simple configuration.

Figure 2:
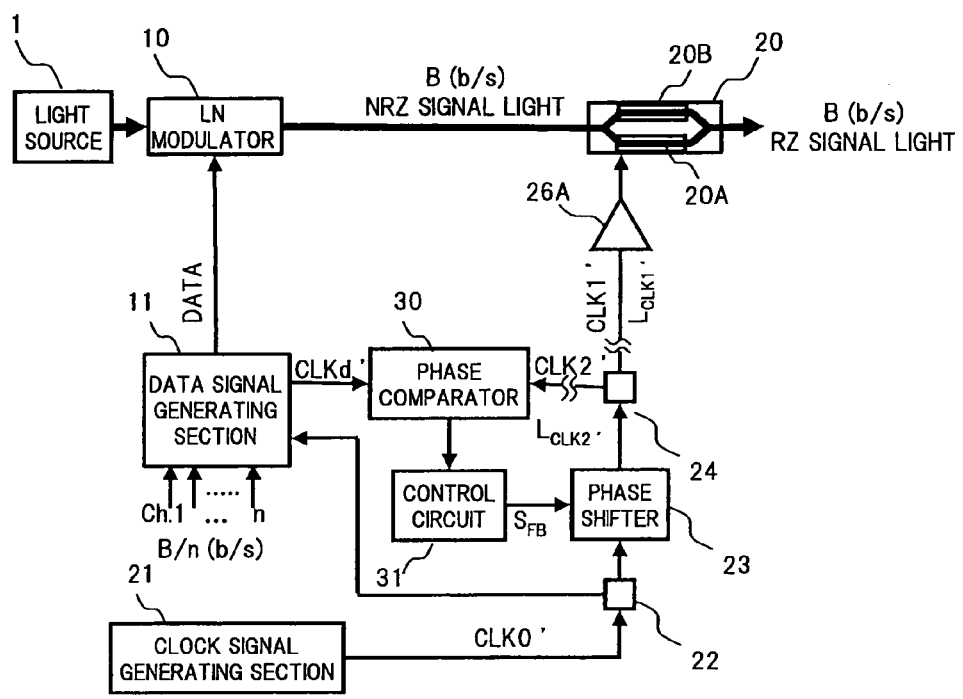
FIG. 2 is a block diagram showing another configuration example related to the first embodiment.

In the above first embodiment, the description has been made for the optical modulator in which the former stage LN modulator 10 is driven by the data signal DATA of B/n (b/s) and the latter stage LN modulator 20 is driven by the clock signals CLK1 and CLK2 of B/2 (Hz), to generate the CS-RZ signal light of B (b/s). However, the present invention is not limited thereto. For example, as shown in FIG. 2, similarly to the first embodiment, it is also possible to apply the control apparatus of the present invention to a modulator or the like in which a clock signal CLK1' having the frequency of B (Hz) corresponding to the bit rate of the data signal DATA driving the former stage LN modulator 10, is given to one electrode 20A of the latter stage LN modulator 20, while the other electrode 20B is earthed, to generate an RZ signal light of B (b/s). In this case, it is provided that the data signal generating section 11 outputs a clock signal CLKd' of B/n (Hz) extracted from the data signal DATA of B/n (b/s) to the phase comparator 30, and the phase comparator 30 compares between a phase of the clock signal CLKd' and a phase of a clock signal CLK2' branched by a branching device 24. Here also, a physical length $L_{CLK1'}$ of a signal line which propagates the clock signal $C_{LK1'}$ between the branching device 24 and the electrode 20A of the latter stage LN modulator 20 and a physical length $L_{CLK2'}$ of a signal line which propagates the clock signal CLK2' between the branching device 24 and the phase comparator 30 are set to become the same ($L_{CLK1'}=L_{CLK2'}$). Furthermore, as a specific configuration of the phase comparator 30, for example, a D flip-flop may be used, and the constitution may be such that the clock signal CLK2' from the branching device 24 and the clock signal CLKd' from the data signal generating section 11 are respectively given to a data input terminal and a clock input terminal of the D flip-flop, to generate the control signal $S_{FB}$ by the control circuit 31 using an output signal from the D flip-flop. In addition, in the configuration of FIG. 2, if a frequency of the clock signal CLK1' is set to B/2 (Hz) and the latter stage LN modulator 20 is driven with the voltage amplitude of $2 \times V\pi$, it is also possible to generate the CS-RZ signal light of B (b/s).

Figure 3:
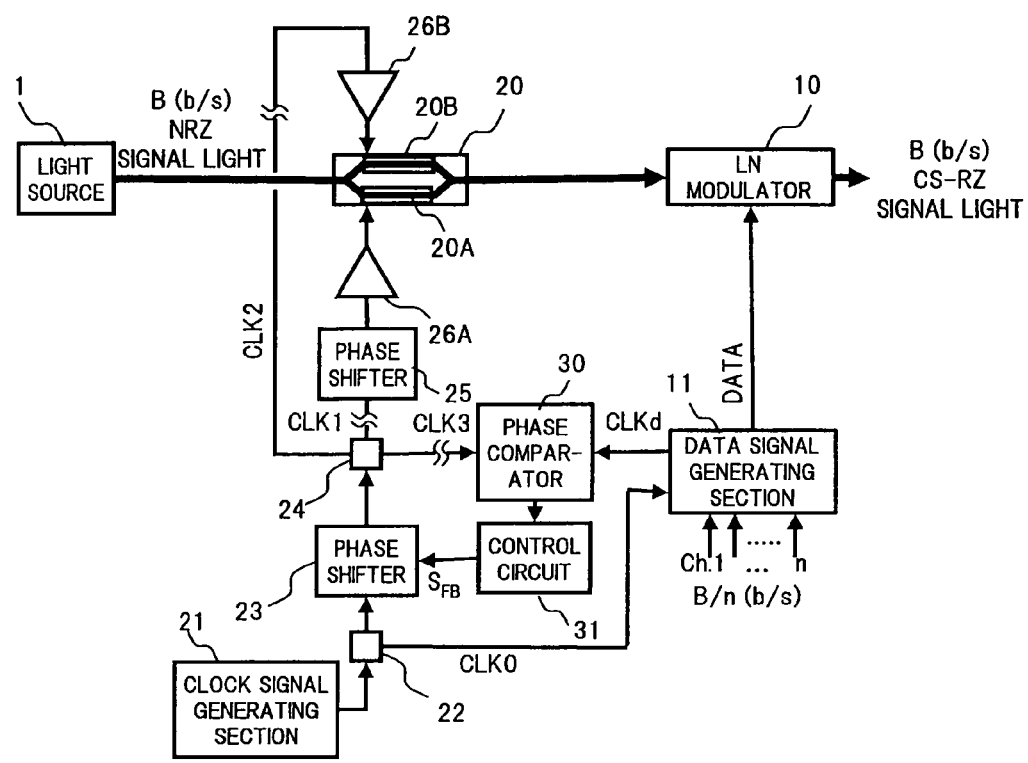
FIG. 3 is a block diagram showing a further configuration example related to the first embodiment.

Furthermore, in the first embodiment, the description has been made on the constitution in which the former stage LN modulator is driven by the data signal and the latter stage LN modulator is driven by the clock signal. However, as shown in FIG. 3, the constitution may be such that the positions of the former stage LN modulator and the latter stage LN modulator are interchanged, so that the former stage LN modulator is driven by the clock signal and the latter stage LN modulator is driven by the data signal. Such a constitution may also be applied to the other embodiments described hereunder.

Next is a description of a second embodiment of the control apparatus for the optical modulator according to the present invention.

Figure 4:
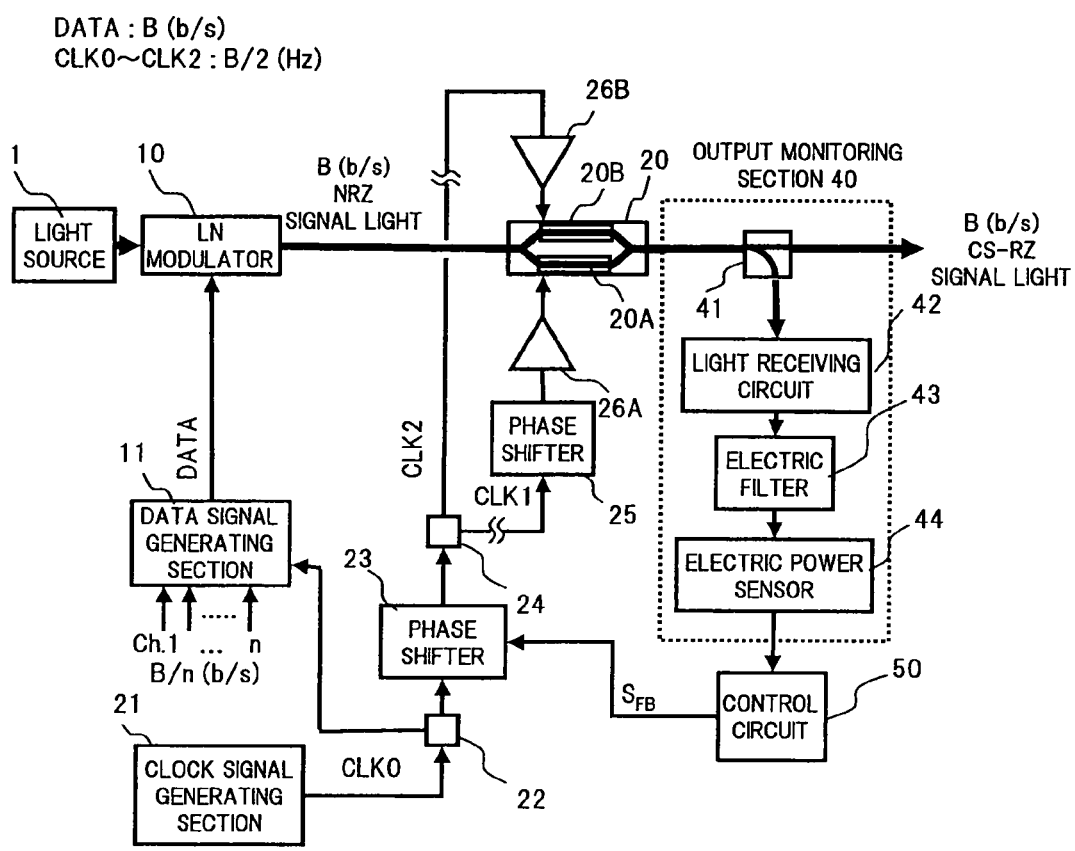
FIG. 4 is a block diagram showing a configuration of a second embodiment of the present invention.

FIG. 4 is a block diagram showing a configuration of the control apparatus for the optical modulator according to the second embodiment.

In FIG. 4, similarly to the first embodiment, the control apparatus of the second embodiment is applied to the optical modulator in which the former stage LN modulator 10 is driven by the data signal DATA and the latter stage LN modulator 20 is driven by the clock signals CLK1 and CLK2, to output the signal light of the CS-RZ modulation system. The constitution of the present control apparatus differs from that of the first embodiment in that, instead of the phase comparator 30 and the control circuit 31 in the first embodiment, there are provided: an output monitoring section 40 that branches a part of the signal light output from the latter stage LN modulator 20 as a monitor light, and then photo-electric converts this to acquire the electric spectrum, and monitors the intensity of a specific frequency component of the electric spectrum; and a control circuit 50 that, based on an intensity variation of the specific frequency component monitored by the output monitoring section 40, judges the phase shift between the data signal DATA, and the clock signals CLK1 and CLK2, to feedback control the phase shifter 23. Since other components are similar to those of the first embodiment, the description thereof is omitted here.

The output monitoring section 40 includes, for example, an optical coupler 41, a light receiving circuit 42, an electric filter 43, and an electric power sensor 44. The optical coupler 41 branches a part of the CS-RZ signal light output from the latter stage LN modulator 20 as a monitor light, to send this to the light receiving circuit 42. The light receiving circuit 42 is a circuit photo-electric converting the monitor light branched by the optical coupler 41 to acquire the electric spectrum. The electric filter 43 is an electric band-pass filter capable of extracting a specific frequency component the intensity of which is changed most largely corresponding to the phase shift between the data signal and clock signals, from the electric spectrum obtained by the light receiving circuit 42. The above specific frequency component will be described later. The electric power sensor 44 measures the intensity of an electric signal extracted by the electric filter 43, to output the measurement result to the control circuit 50.

The control circuit 50 generates the control signal $S_{FB}$ for feedback controlling the phase adjustment amount of the phase shifter 23 so that the intensity of the specific frequency component measured by the electric power sensor 44 becomes a maximum. This feedback control by the control circuit 50 is performed based on a characteristic of change in the electric spectrum of the CS-RZ signal light to a phase change between the data signal DATA, and the clock signals CLK1 and CLK2 as described in the next.

Figure 5:
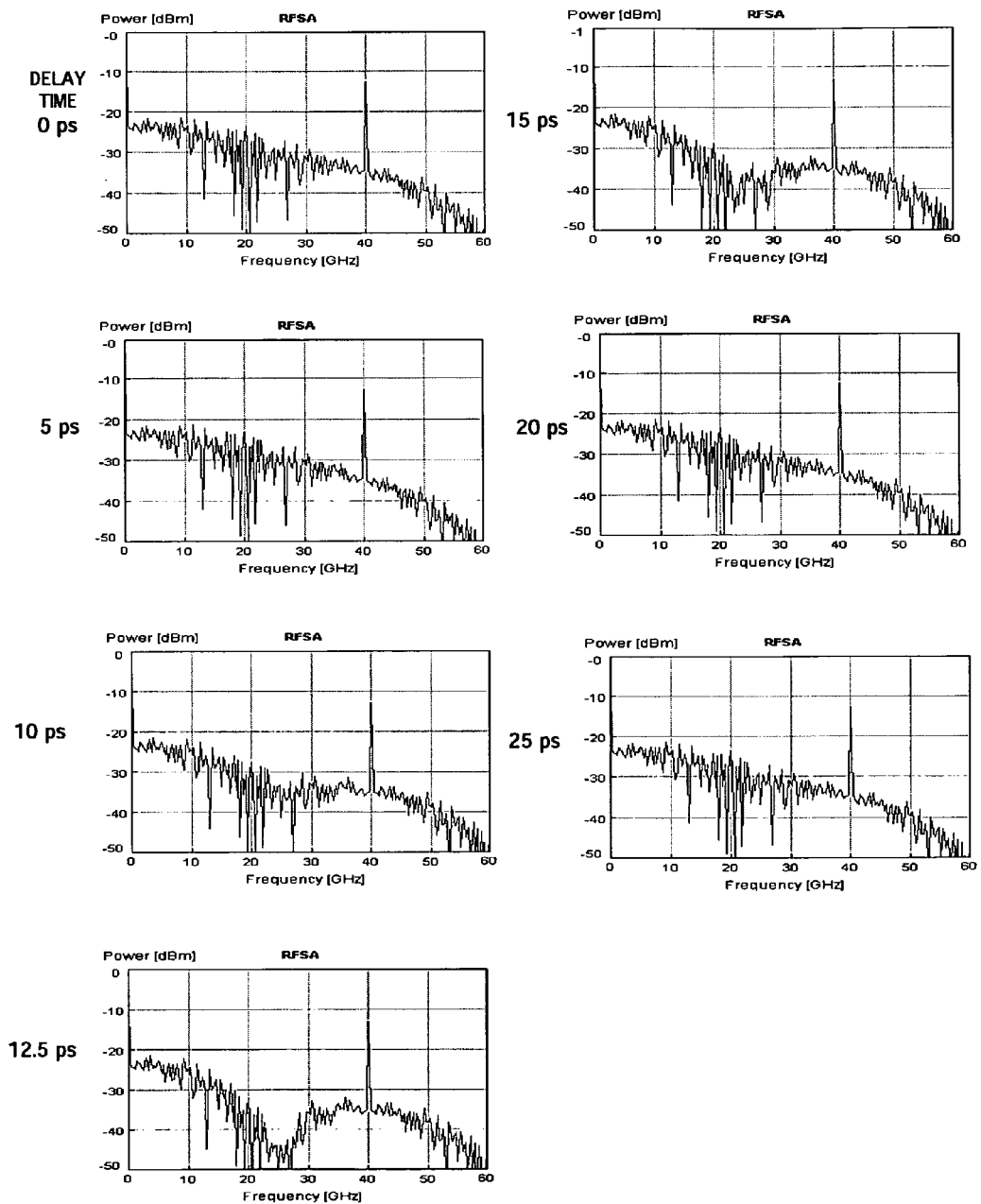
FIG. 5 is a diagram showing examples of electric spectrum of output light generated when a phase between a data signal and a clock signal is changed.
Figure 6:
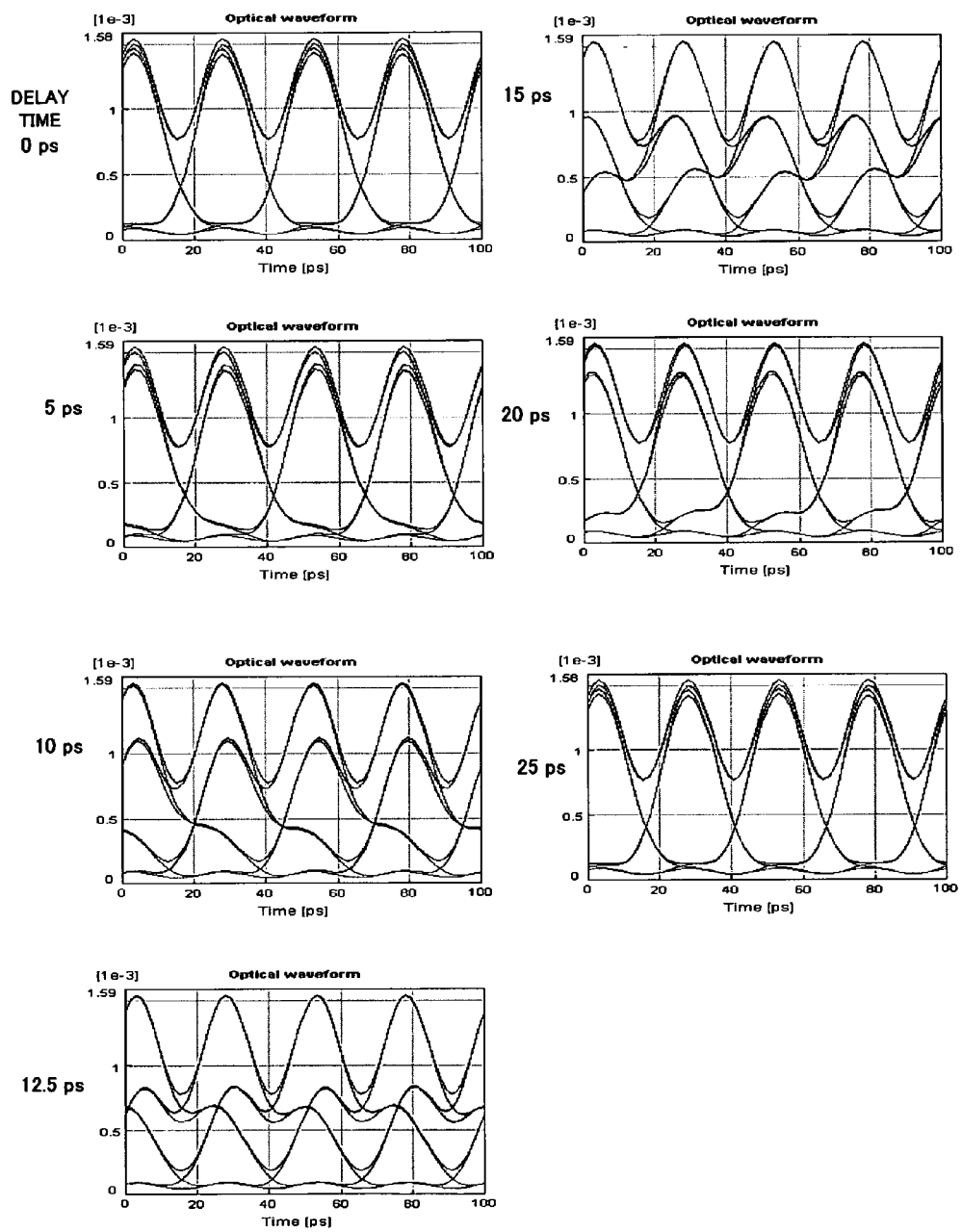
FIG. 6 shows examples of optical waveform of output light generated when a phase between a data signal and a clock signal is changed.

FIG. 5 shows examples of the electric spectrum of the CS-RZ signal light generated when the phase between a data signal of 40 Gb/s and a clock signal of 20 GHz is changed. Moreover, FIG. 6 shows examples of the optical waveform of the CS-RZ signal light generated when the phase is changed similarly to FIG. 5. Here, with a condition where the phase between the data signal and the clock signals is optimized (delay time due to the phase shift between signals is 0 ps) as a reference, the phase of the clock signal is changed until the original optimum phase condition (delay time is 25 ps) is restored after the phase shift continues to be increased.

As shown in FIG. 6, even if the phase shift corresponds to only 5 ps (1 mm if converted into coaxial cable length) of a delay time between the data signal and the clock signals, it is understood that the optical waveform of the CS-RZ signal light is largely deteriorated. At this time, as shown in FIG. 5, if the phase between the data signal, and the clock signals is shifted from an optimum point, it is understood that the intensity of the electric spectrum of the CS-RZ signal light in the domain separated to the lower side from the 40 GHz frequency corresponding to the bit rate of the data signal (in the example of FIG. 5, the frequency domain spanning several GHz with a center of approximately 25 GHz) is reduced.

Therefore, in the present embodiment, paying attention to the specific frequency component the intensity of which is largely changed corresponding to the phase shift between the data signal and the clock signals as described above, a generation condition of the phase shift is judged based on the intensity change in the specific frequency component, to feedback control the phase shifter 23 so that the phase shift between the data signal and the clock signals is optimized.

Figure 7:
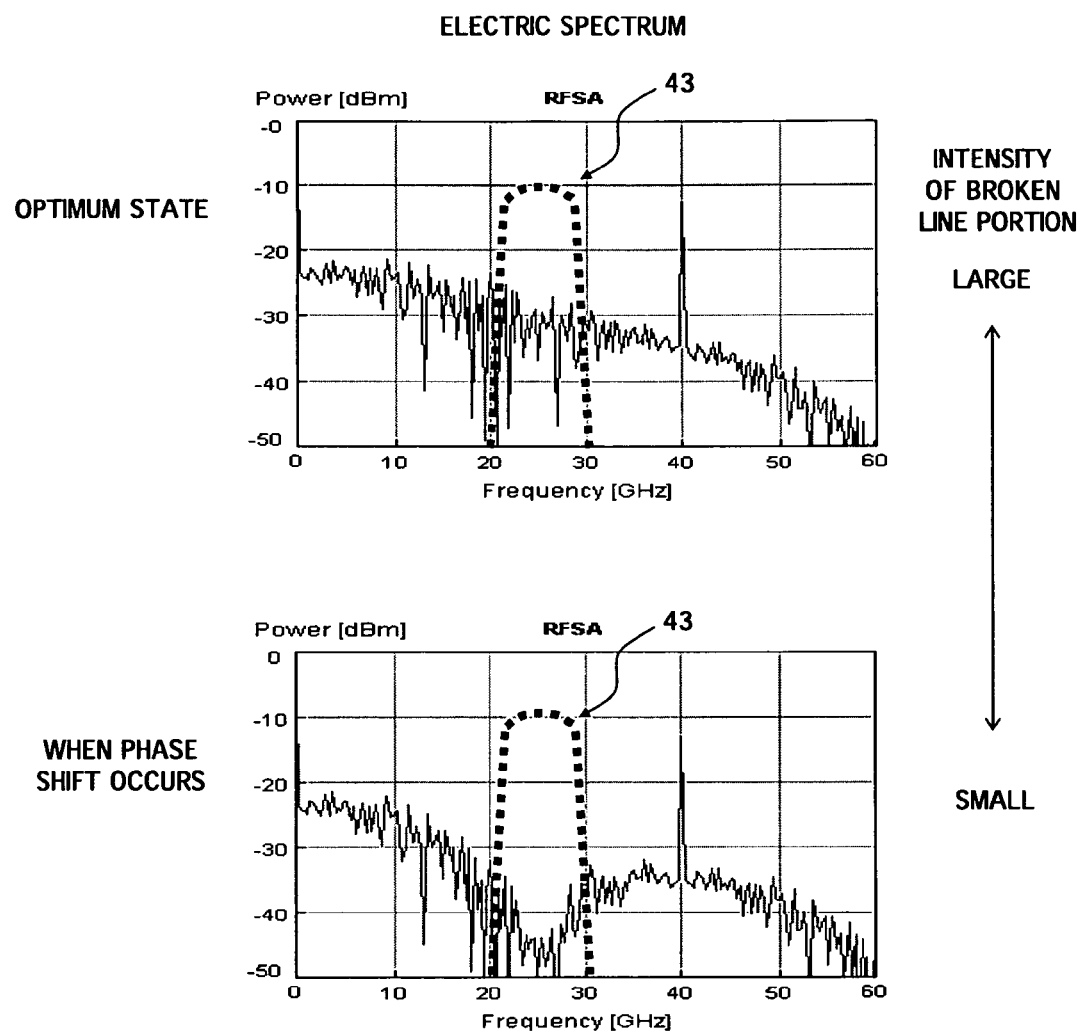
FIG. 7 is a diagram for explaining a detection operation of phase shift in the second embodiment.

Specifically, in the case where the electric spectrum corresponding to the above described CS-RZ signal light of 40 Gb/s is obtained by the light receiving circuit 42, then as shown by the broken line portion in FIG. 7, a central frequency of transmission band of the electric filter 43 is set to match with a frequency of approximately 25 GHz at which the intensity is changed most largely corresponding to the phase shift. As is also apparent from FIG. 7, the less the phase shift between the data signal and the clock signals becomes, the more the intensity of the specific frequency component extracted by this electric filter 43 is increased. Therefore, the phase shifter 23 is feedback controlled so that the intensity measured by the electric power sensor 44 becomes a maximum, thus it becomes possible to optimize the phase difference between the data signal and the clock signals.

Furthermore, since the above electric filter 43 has a characteristic such that the bandwidth of the transmission band thereof is as narrow as possible and the transmissivity is sharply changed at both ends of the transmission band, it becomes possible to detect the phase shift between the data signal and the clock signals with higher accuracy. To realize an electric filter having such a sharp filter characteristic in the narrow band is easy compared to the optical filter used in the prior invention described above. Therefore, the phase difference between the data signal and the clock signals can be more stably optimized.

Furthermore, in the control circuit 50, a maximum value of the intensity measured by the electric power sensor 44 is detected by applying a well-known processing such as the dithering. Thus, it is also possible to detect a traveling direction of the phase shift. If in this manner, the traveling direction of the phase shift is detected to feedback control the phase shifter 23, the phase difference between the data signal and the clock signals can be optimized at higher speed.

As described above, according to the second embodiment, the intensity change in the specific frequency component for the electric spectrum of the output light from the latter stage LN modulator 20 is monitored. Thus, it becomes possible to reliably detect the phase shift between the data signal and the clock signals to feedback control the phase shifter 23. As a result, it becomes possible to generate the CS-RZ signal light in a stable drive condition.

In the second embodiment, the description has been made on the case where a band-pass filter is used as the electric filter 43. However, in the present invention, the electric filter extracting the specific frequency component from the electric spectrum of the output light is not limited to the above. For example, it is also possible to use a low-pass filter having the cut-off frequency in the lower domain than the frequency corresponding to the bit rate of the data signal and also in the higher domain than the frequency at which the intensity is changed most largely according to the phase shift. However, in order to detect the phase shift with higher accuracy, it is desirable to use the band-pass filter.

Next is a description of a third embodiment of the control apparatus for the optical modulator according to the present invention.

In the above described second embodiment, the case has been shown where, based on the electric spectrum of the output light, the phase shift between the data signal and the clock signals is detected to feedback control the phase shifter 23. In the third embodiment, the description is made on the control apparatus in which, based on the electric spectrum of the output light, the phase shift between the clock signals CLK1 and CLK2 driving the latter stage LN modulator 20, is detected to feedback control the phase shifter 23.

Figure 8:
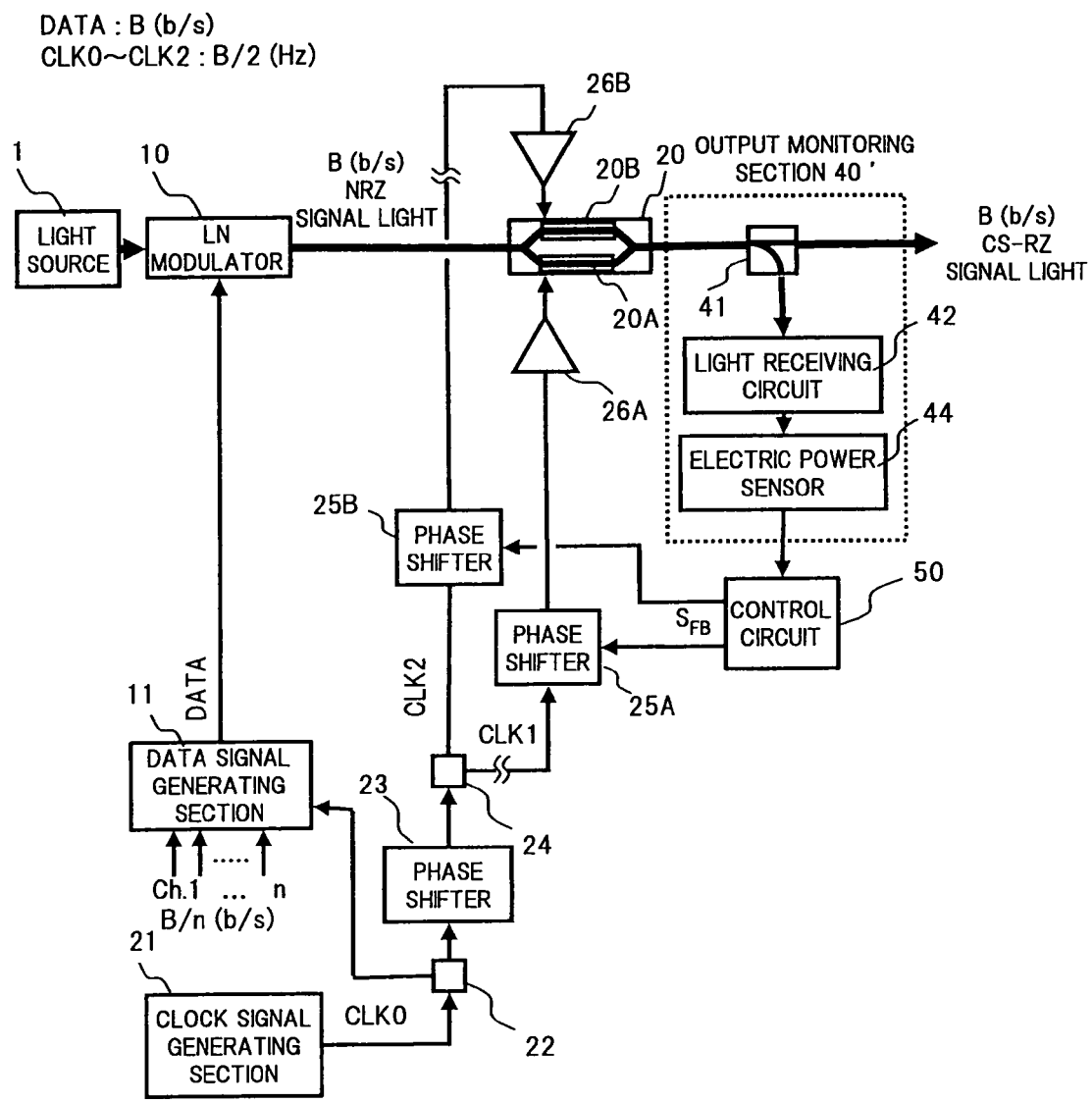
FIG. 8 is a block diagram showing a configuration of a third embodiment of the present invention.

FIG. 8 is a block diagram showing a configuration of the control apparatus for the optical modulator according to the third embodiment.

In FIG. 8, the constitution of the present embodiment differs from that of the second embodiment in that there is provided an output monitoring section 40' with the electric filter 43 omitted from the output monitoring section 40 used in the second embodiment. A monitoring result in this output monitoring section 40' is sent to the control circuit 50, and the control circuit 50 feedback controls phase shifters 25A and 25B so that a phase difference between the clock signals CLK1 and CLK2 is optimized. Here, a configuration example is shown, in which the phase shifter 25A is arranged between the branching device 24 and the amplifier 26A, and the phase shifter 25B is arranged between the branching device 24 and the amplifier 26B corresponding to the clock signals CLK1 and CLK2 which are given to the electrodes 20A and 20B of the latter stage LN modulator 20, to adjust the phase difference between the clock signals CLK1 and CLK2 by the two phase shifters 25A and 25B. However, similarly to the first and second embodiments described above, the constitution may be such that the phase of one clock signal is adjusted by a phase shifter, to relatively control the phase difference between the two clock signals.

The output monitoring section 40' branches a part of the CS-RZ signal light output from the latter modulator 20 as a monitor light by the optical coupler 41, photo-electric converts the monitor light by the light receiving circuit 42 to acquire the electric spectrum, and directly sends the electric spectrum to the electric power sensor 44 without passing through an electric filter. The electric power sensor 44 measures the intensity of the electric spectrum over the whole frequency band (hereunder, total power), to output a signal indicating the measurement result to the control circuit 50.

The control circuit 50 generates the control signal $S_{FB}$ for feedback controlling phase adjustment amounts of the respective phase shifters 25A and 25B, so that the total power measured by the electric power sensor 44 becomes maximum. This feedback control by the control circuit 50 is performed based on the characteristic of change in the electric spectrum of the CS-RZ signal light to a phase change between the clock signal CLK1 and the clock signal CLK2 as described later.

Figure 9:
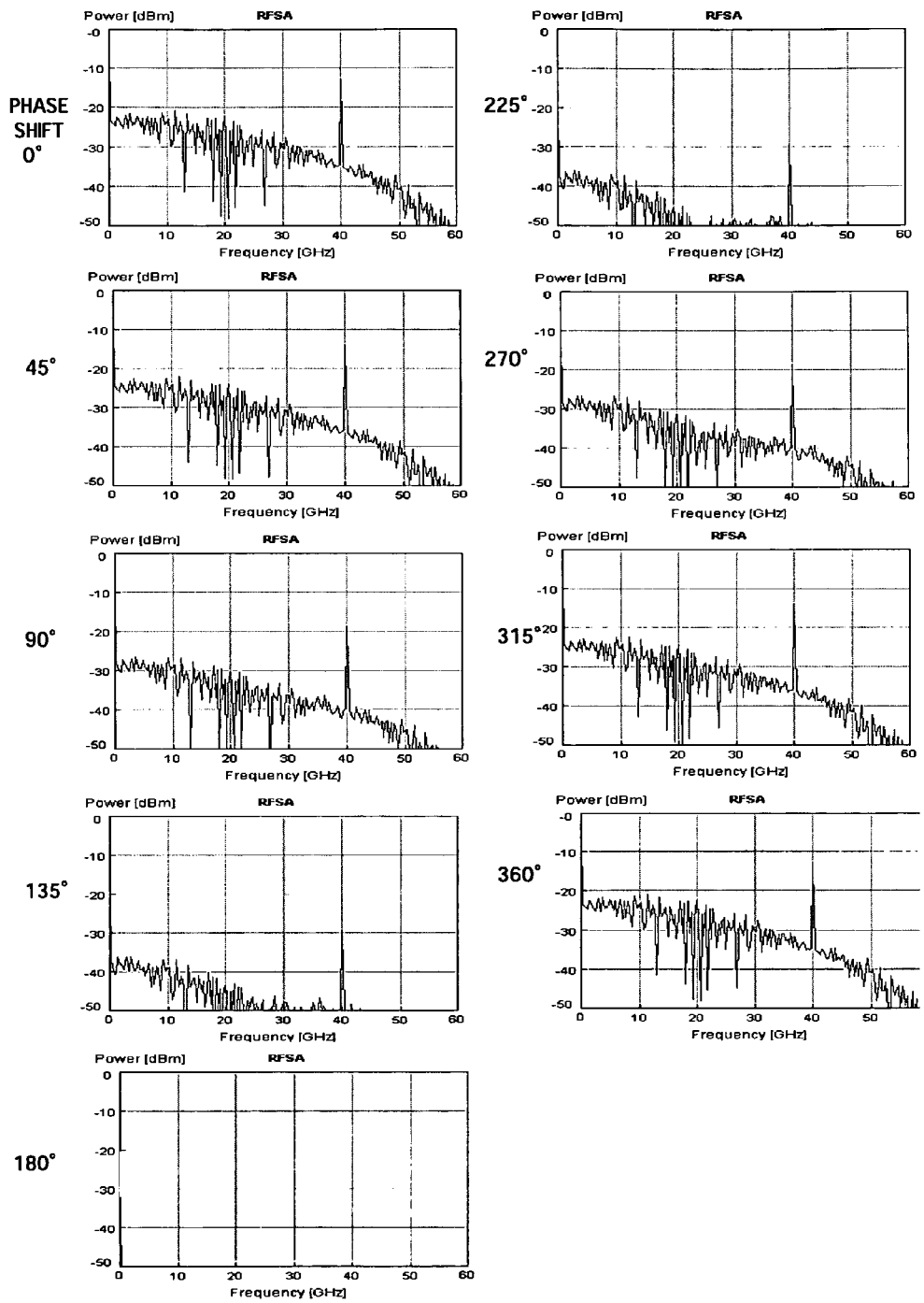
FIG. 9 is a diagram showing examples of electric spectrum of output light generated when a phase between dual system clock signals is changed.
Figure 10:
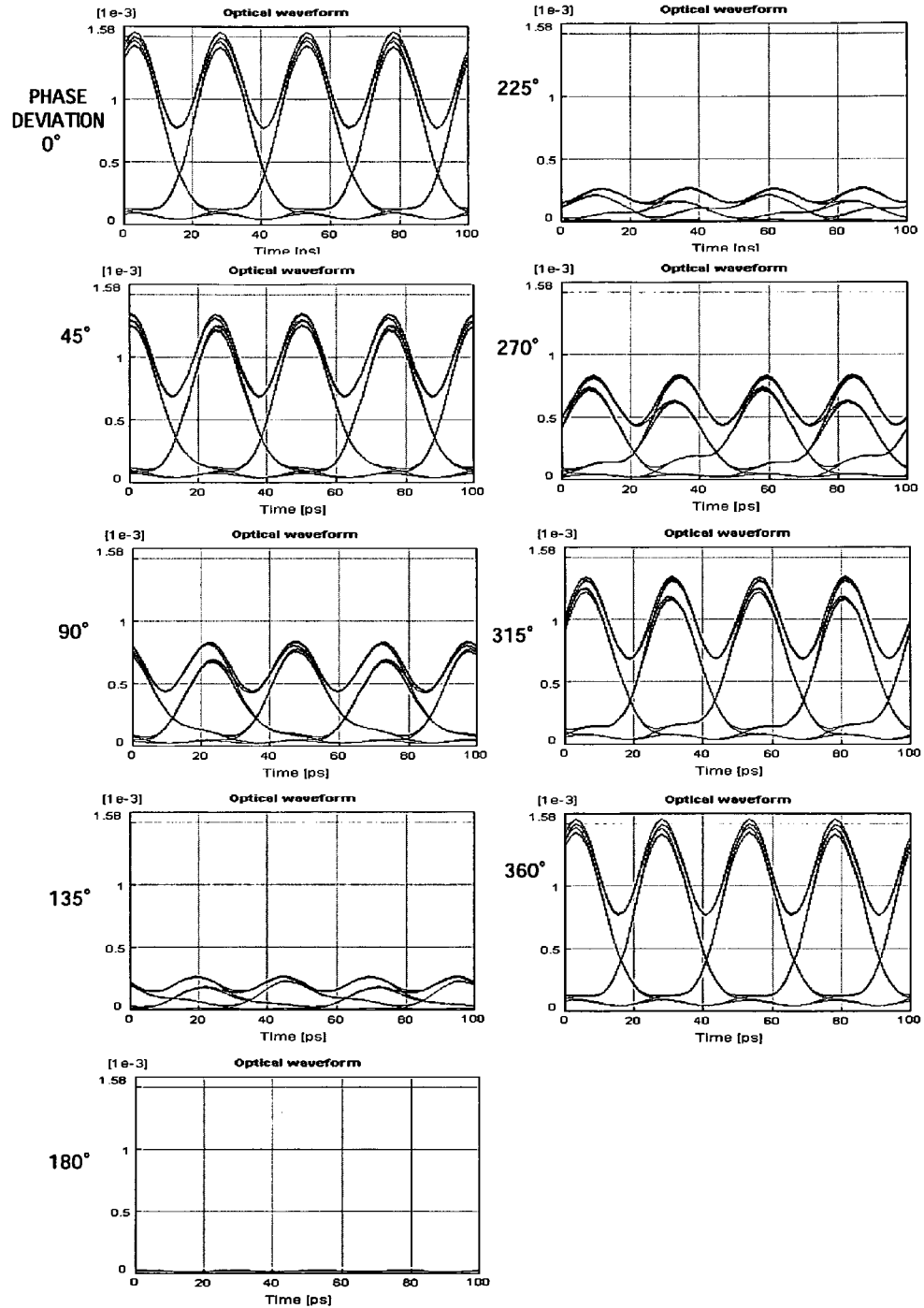
FIG. 10 is a diagram showing examples of optical waveform of output light generated when a phase between dual system clock signals is changed.

FIG. 9 shows examples of the electric spectrum of the CS-RZ signal light generated when a relative phase between the clock signals CLK1 and CLK2 of 20 GHz is changed. Moreover, FIG. 10 shows examples of the optical waveform of the CS-RZ signal light generated when the phase is changed similarly to the case of FIG. 9. Here, with a condition where the phase between the clock signals CLK1 and CLK2 is optimized (phase shift between the respective signals is 0°) as a reference, the phase difference between the respective clock signals is changed until the original optimum phase condition (phase shift is 360°) is restored after the phase shift continues to be gradually increased.

When the phase shift between the clock signals CLK1 and CLK2 is increased, it is understood that, as shown in FIG. 10, the optical waveform of the output light is largely deteriorated and the output light is quenched when the phase shift reaches 180°. At this time, as shown in FIG. 9, it is apparent that the total power of the electric spectrum of the output light is decreased accompanying the increase of the phase shift between the clock signals CLK1 and CLK2.

Therefore, in the present embodiment, a generation condition of the phase shift is judged based on a change in the total power which is changed corresponding to the above described phase shift between the clock signals CLK1 and CLK2, to feedback control the phase shifters 25A and 25B so that the phase shift between the clock signals CLK1 and CLK2 is optimized.

Figure 11:
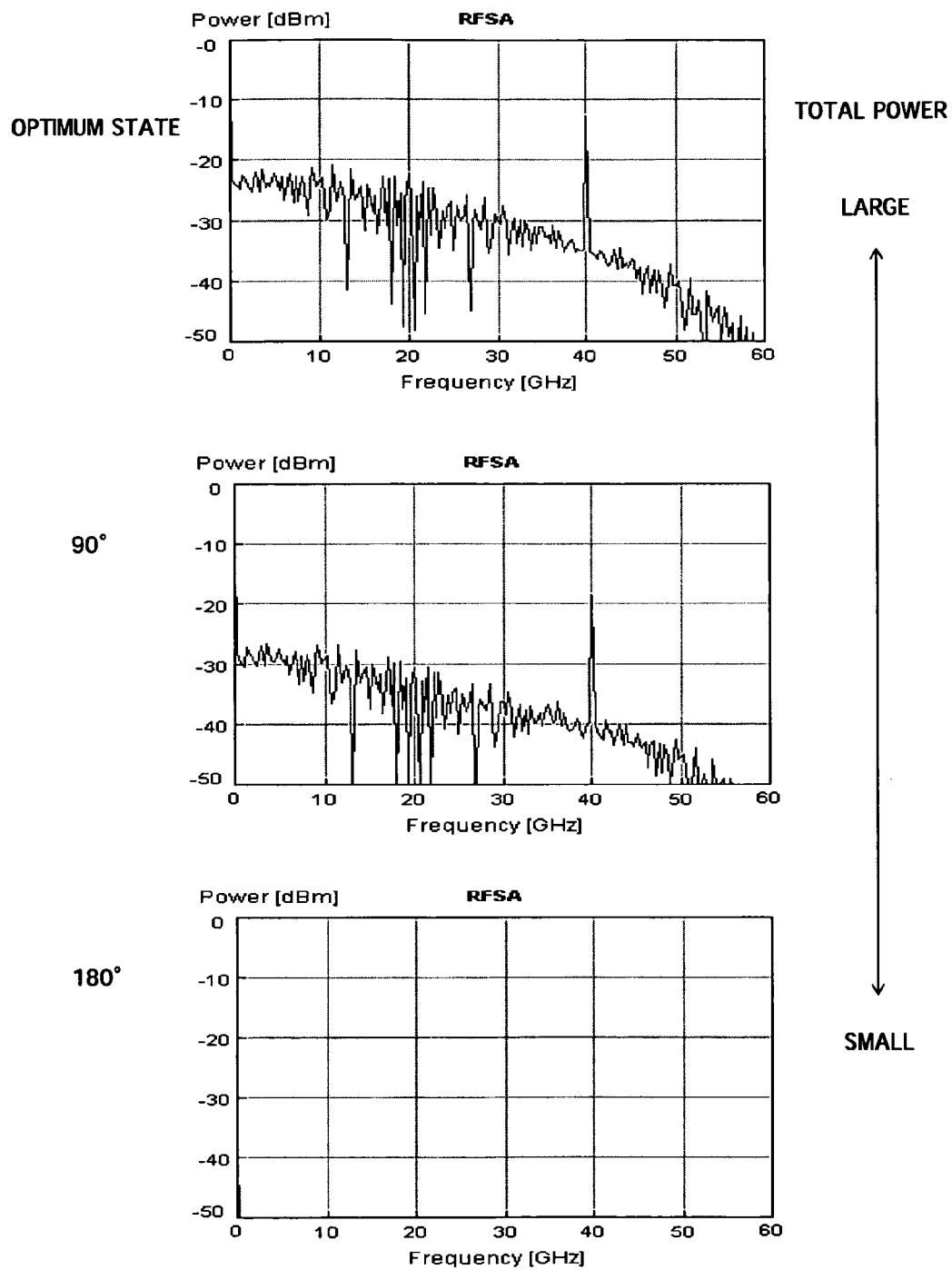
FIG. 11 is a diagram for explaining a detection operation of phase shift in the third embodiment.

More specifically, in the case where the electric spectrum corresponding to the above described CS-RZ signal light of 40 Gb/s can be obtained by the light receiving circuit 42, then as is also apparent from the change in the electric spectrum extracted in FIG. 11, the less the phase shift between the clock signals CLK1 and CLK2 becomes, the more the total power measured by the electric power sensor 44 is increased. Therefore, the phase shifters 25A and 25B are feedback controlled so that the total power becomes a maximum. Thus, it becomes possible to optimize the phase shift between the clock signals CLK1 and CLK2.

Furthermore, in the control circuit 50, the maximum value of the intensity measured by the electric power sensor 44 is detected by applying the well-known processing such as the dithering. Thus, it is also possible to detect a traveling direction of the phase shift. If in this manner, the traveling direction of the phase shift is detected to feedback control the phase shifters 25A and 25B, the phase difference between the clock signals CLK1 and CLK2 can be optimized at higher speed.

As described above, according to the third embodiment, the total power of the electric spectrum of the output light from the latter stage LN modulator 20 is monitored. Therefore, the phase shift between the two clock signals CLK1 and CLK2 driving the latter stage LN modulator 20 can be reliably detected, to feedback control the phase shifters 25A and 25B. As a result, it becomes possible to generate the CS-RZ signal light in a stable drive condition.

In the above described second and third embodiments, the description has been made on the optical modulator in which the former stage LN modulator 10 is driven by the data signal of B (b/s) and the latter stage LN modulator 20 is driven by the clock signal of B/2 (Hz), to generate the CS-RZ signal light of B (b/s). However, the present invention is not limited thereto, and similarly to the above described case exemplified in FIG. 2, the present invention can also be applied to an optical modulator in which the clock signal having the frequency of B/2 (Hz) corresponding to the bit rate of the data signal driving the former stage LN modulator 10 is given to one of the electrodes in the latter stage LN modulator 20, to generate the RZ signal light of B (b/s).

Next is a description of a fourth embodiment of the control apparatus for the optical modulator according to the present invention. In the fourth embodiment, the description is for the control apparatus capable of realizing a control corresponding to an operating point variation of the optical modulator.

First is a brief description of operating point variation of the optical modulator is to be controlled in the present embodiment. Generally, a Mach-Zehnder optical modulator is used for generating the signal light corresponding to the CS-RZ modulation system. An advantage of this optical modulator is that a wavelength variation of the transmission light is small. However, there is a problem that, due to a temperature change or aging of the material used for the substrate (for example, lithium niobate), the operating point of an electro-optic conversion characteristic is varied with time.

In order to suppress this operating point variation, conventionally concerning the generation of signal light corresponding to the NRZ modulation system, a technique has been known, for example, for giving a drive signal superposed with a low frequency signal to a Mach-Zehnder optical modulator, extracting a low frequency signal component contained in the output light to detect the operating point variation, and based on the detection result, feedback controlling the DC bias of the optical modulator (for detail, refer to Japanese Unexamined Patent Publication No. 3-251815).

Figure 12:
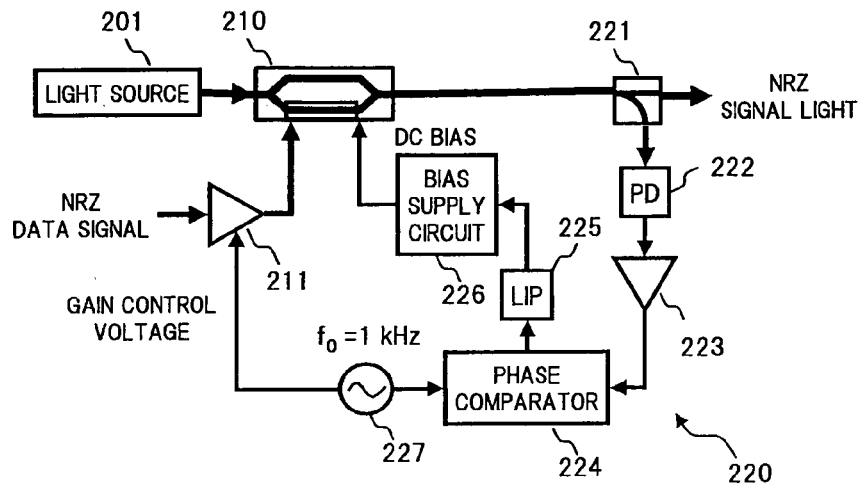
FIG. 12 is a block diagram showing a schematic configuration of a control apparatus applied with a known operating point compensation system.
Figure 13:
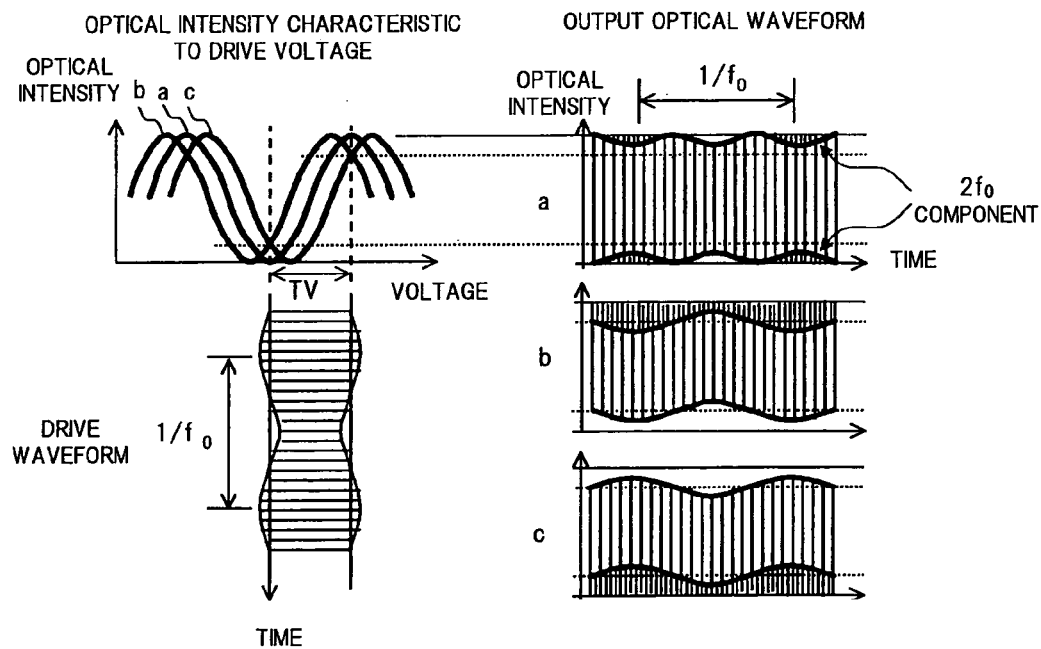
FIG. 13 is a diagram for explaining the theory of how the control apparatus of FIG. 12 stabilizes the operating point.

FIG. 12 is a block diagram showing a schematic configuration of the control apparatus to which the above described well-known technique is applied. Furthermore, FIG. 13 is a diagram for explaining the theory of how the control apparatus of FIG. 12 compensates for the operating point In the constitution of FIG. 12, a low frequency signal (frequency is f0=1 kHz or the like) generated by an oscillator 227 is given to a drive circuit 211 driving a Mach-Zehnder optical modulator 210, as a gain control voltage, to generate an NRZ data signal which is amplitude modified in accordance with the low frequency signal, as shown at the bottom left in FIG. 13, and the NRZ data signal is applied to an electrode of the modulator 210. As a result, an input light from a light source 201 is externally modified. Then, after a part of the NRZ signal light output from the modulator 210 is branched as a monitor light by an optical coupler 221, this branched light is converted into an electric signal by an optical receiver (PD) 222, and the frequency f0 component contained in the electric signal is selectively amplified by an amplifier 223 to be sent to a phase comparator 224. In the phase comparator 224, a comparison is performed between a phase of an output signal from the amplifier 223 and a phase of the low frequency signal from the oscillator 227, and a signal indicating the comparison result is given, via a low-pass filter 225 eliminating unnecessary components, to a bias supply circuit 226, and the DC bias adjusting the operating point of the modulator 210 is controlled.

An optimum operating point of the Mach-Zehnder optical modulator in the NRZ modulation, as shown by the curve "a" at the top left of FIG. 13, is a point where the high level and low level of the waveform of the drive signal, the amplitude of which is set to Vπ, gives the maximum and minimum power of the output light. When the modulator 210 is driven at this optimum operating point, then as shown at the top right of FIG. 13, the NZR signal light output from the modulator 210 does not contain the frequency f0 component, but a component twice the frequency f0 component is generated.

On the other hand, as shown by curves "b" and "c" at the top left of FIG. 13, when the operating point of the modulator 210 is shifted from the optimum operating point, then according to a shifted direction, relative to an envelope of the high level or low level, the phases are reversed between the drive waveform and the output light waveform. In the output light at this time, as shown at the middle and bottom right in FIG. 13, the envelopes of the high level and low level become waveforms modulated at the same phase, and contain the frequency f0 component. The phase of the frequency f0 component contained in the output light is reversed when a variation direction of the operating point is changed. Therefore, by comparing the phase of the frequency f0 component with a phase of the low frequency signal superimposed on the drive signal, it becomes possible to detect the variation direction of the operating point. Accordingly, by feedback controlling the DC bias applied to the modulator 210 corresponding the phase comparison result in the phase comparator 224, it becomes possible to drive the modulator 210 at the optimum operating point.

In the case where the above compensation technique of the operating point related to the generation of signal light cor-responding to the NRZ modulation system is applied to the generation of signal light of the CS-RZ modulation system in which modulators of two stage configuration are used, then for one modulator performing the NRZ modulation based on the data signal, the operating point can be effectively compensated. However, for the other modulator driven by the clock signal, the drive amplitude 2Vπ twice the NRZ modulation is used (refer to FIG. 27). Therefore, in the case where the operating point is deviated from the optimum point, the envelopes of the output light waveform corresponding to the high level side and low level side of the low frequency modulated drive signal, become opposite phases to counteract each other, and the frequency f0 component cannot be detected from the output light Therefore, differently from the CS-RZ modulation system or the RZ modulation system, the conventional operating point compensation technique as described above cannot be applied to the modulation system which is driven between two peaks of emitted light or two peaks of extinct light in the electro-optic conversion characteristic of the Mach-Zehnder optical modulator.

Therefore, in the fourth embodiment of the present invention, for example, for an optical modulator generating a signal light corresponding to the CS-RZ modulation system of B (b/s), there will be described the control apparatus that has realized the operating point compensation of a modulator driven with the voltage amplitude of 2Vπ using a clock signal.

Figure 14:
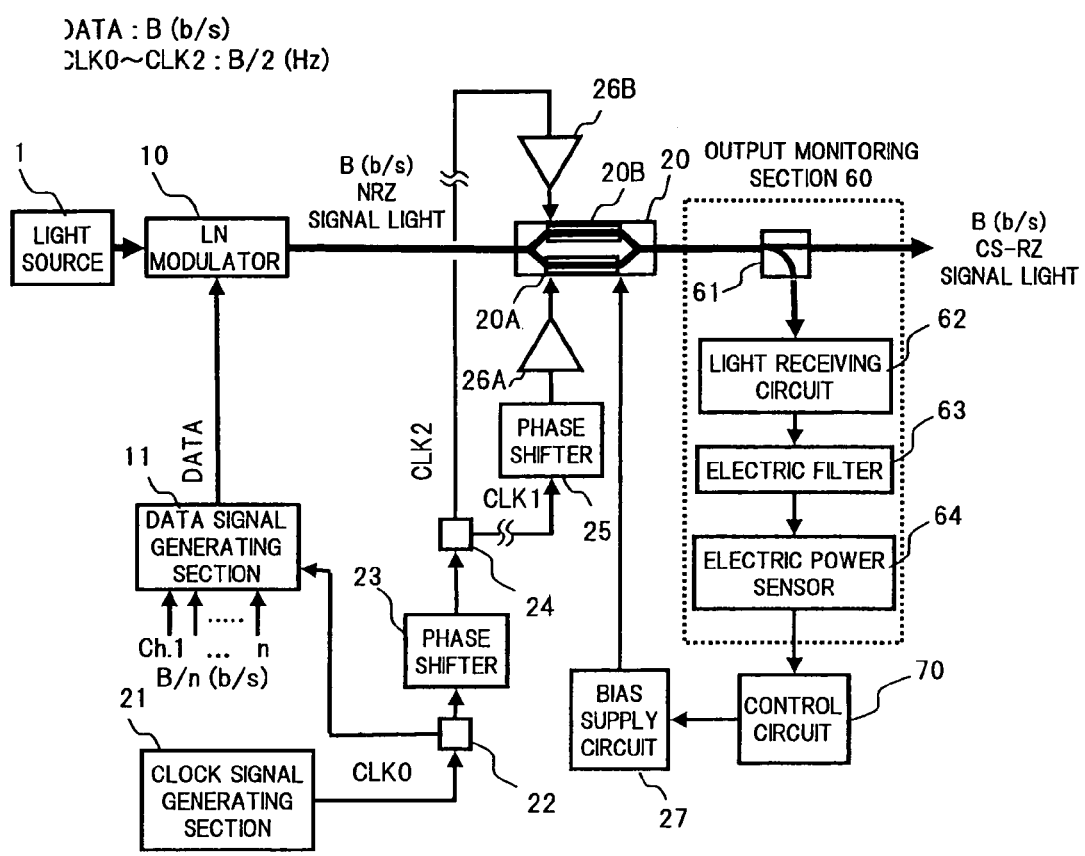
FIG. 14 is a block diagram showing a configuration of a fourth embodiment of the present invention.

FIG. 14 is a block diagram showing the configuration of the control apparatus for the optical modulator according to the fourth embodiment.

In FIG. 14, similarly to the first to the third embodiments, the control apparatus of the fourth embodiment is applied to the optical modulator in which the former stage LN modulator 10 is driven by the data signal DATA of B (b/s) and the latter stage LN modulator 20 is driven by the clock signals CLK1 and CLK2 of B/2 (Hz), to output the signal light of the CS-RZ modulation system. The constitution of the present embodiment differs from that of the other embodiments, in that there is provided a bias supply circuit 27 giving the DC bias for adjusting the operating point, to the latter stage LN modulator 20, and an operation of this bias supply circuit 27 is feedback controlled by an output monitoring section 60 and a control circuit 70, to compensate for the operating point of the latter stage LN modulator 20.

Specifically, the output monitoring section 60 includes, for example, an optical coupler 61, a light receiving circuit 62, an electric filter 63, and an electric power sensor 64. The optical coupler 61 is for branching a part of the CS-RZ signal light output from the latter state LN modulator 20 as a monitor light, to send the branched light to the light receiving circuit 62. The light receiving circuit 62 is for photoelectric converting the monitor light branched by the optical coupler 61, to acquire the electric spectrum. The electric filter 63 is a narrow band electric band-pass filter capable of extracting a frequency component with the center frequency of B/2 (Hz), from the electric spectrum obtained by the light receiving circuit 62. The electric power sensor 64 measures the intensity of the electric signal extracted by the electric filter 63 and outputs the measurement result to the control circuit 70.

The control circuit 70 generates the control signal $S_{FB}$ for feedback controlling the setting of the operation of the bias supply circuit 27 so that the intensity of the frequency component with the center frequency of B/2 (Hz) measured by the electric power sensor 64 becomes a minimum.

Here, although not shown in the figure, the operating point deviation of the former stage LN modulator 10 is compensated for by applying the conventional compensation system in which the above described low frequency signal is superimposed on the drive signal, to compensate for the operating point.

Next is a specific description of the theory of operating point compensation for the latter stage LN modulator 20 in the present embodiment.

Figure 15:
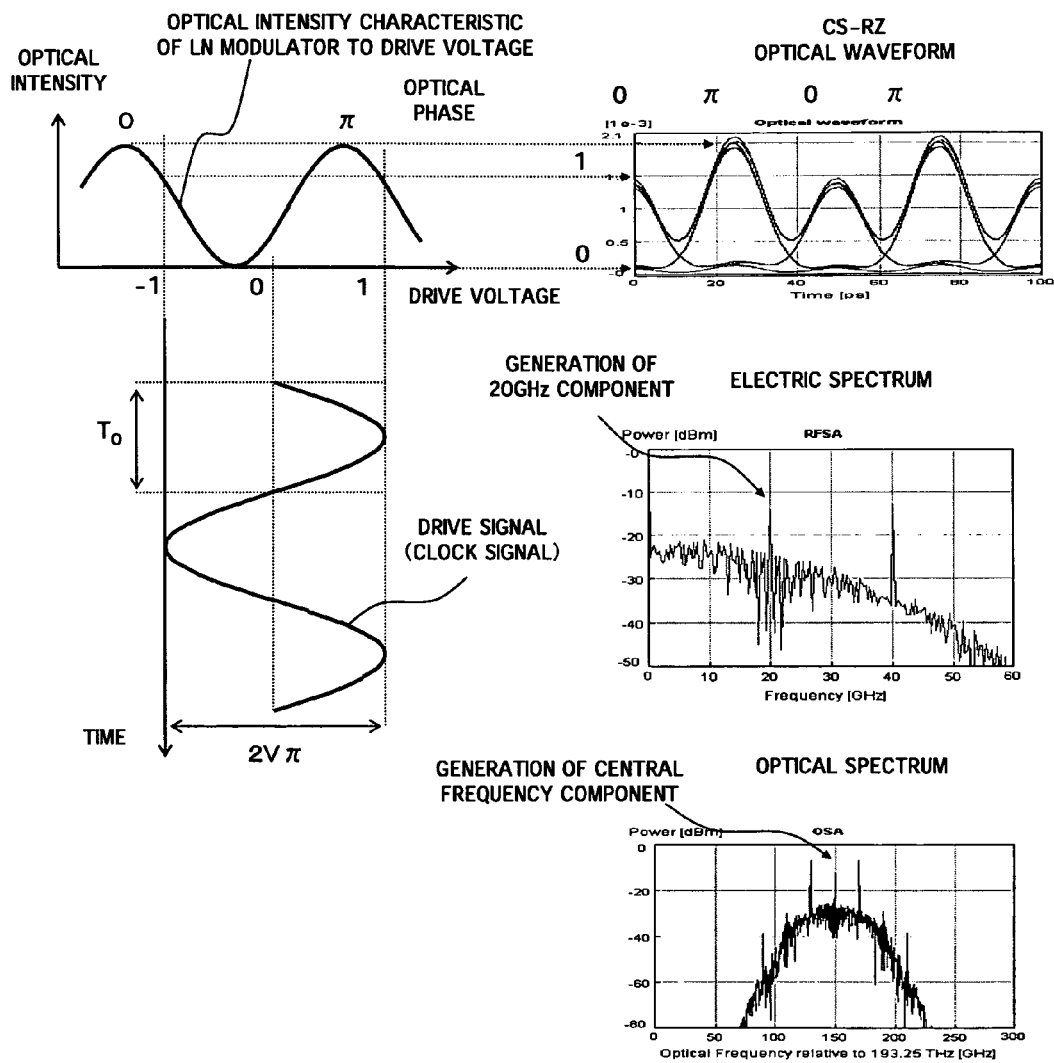
FIG. 15 is a diagram for explaining a change in output light when the operating point deviation occurs in a modulator driven with voltage amplitude of $2V\pi$.

FIG. 15 is a diagram for explaining a change in output light when the operating point deviation occurs in the modulator driven by the voltage amplitude of $2V\pi$.

For example, when the clock signals CLK1 and CLK2 of 20 GHz are given to the respective electrodes 20A and 20B of the latter stage LN modulator 20, as shown at the left in FIG. 15, the potential difference between the respective electrodes 20A and 20B is changed at the amplitude of $2V\pi$ corresponding to one period of the periodic optical intensity characteristic of the LN modulator 20. At this time, if the operating point of the LN modulator 20 is deviated from the optimum point, it is understood that, in the waveform of the CS-RZ signal light of 40 Gb/s output from LN modulator 20, as shown at the top right in FIG. 15, the deviation occurs in the levels between the respective bits. Moreover, in the electric spectrum of the output light, as shown at the middle right in FIG. 15, it is understood that a peak is generated at the frequency of 20 GHz, which was not seen in the case where the operating point is set in optimum (for example, refer to FIG. 5 and FIG. 9). Furthermore, in the optical spectrum of the output light, as shown at the bottom right in FIG. 15, it is understood that a carrier component corresponding to the central optical frequency is generated, which was not seen in the case where the operating point is set in optimum (for example, refer to the bottom right in FIG. 27).

Considering the abovementioned change characteristic of the output light for when the operating point deviation occurs, in the present embodiment, the intensity of the frequency component with the center of 20 GHz of the electric spectrum, that is, the frequency component with the center of B/2 (Hz) corresponding to the frequency of the clock signals CLK1 and CLK2 driving the LN modulator 20, is monitored. Based on the monitoring result, the occurrence condition of the operating point deviation of the LN modulator 20 is judged, and the DC bias is feedback controlled so that the operating point is optimized.

Figure 16:
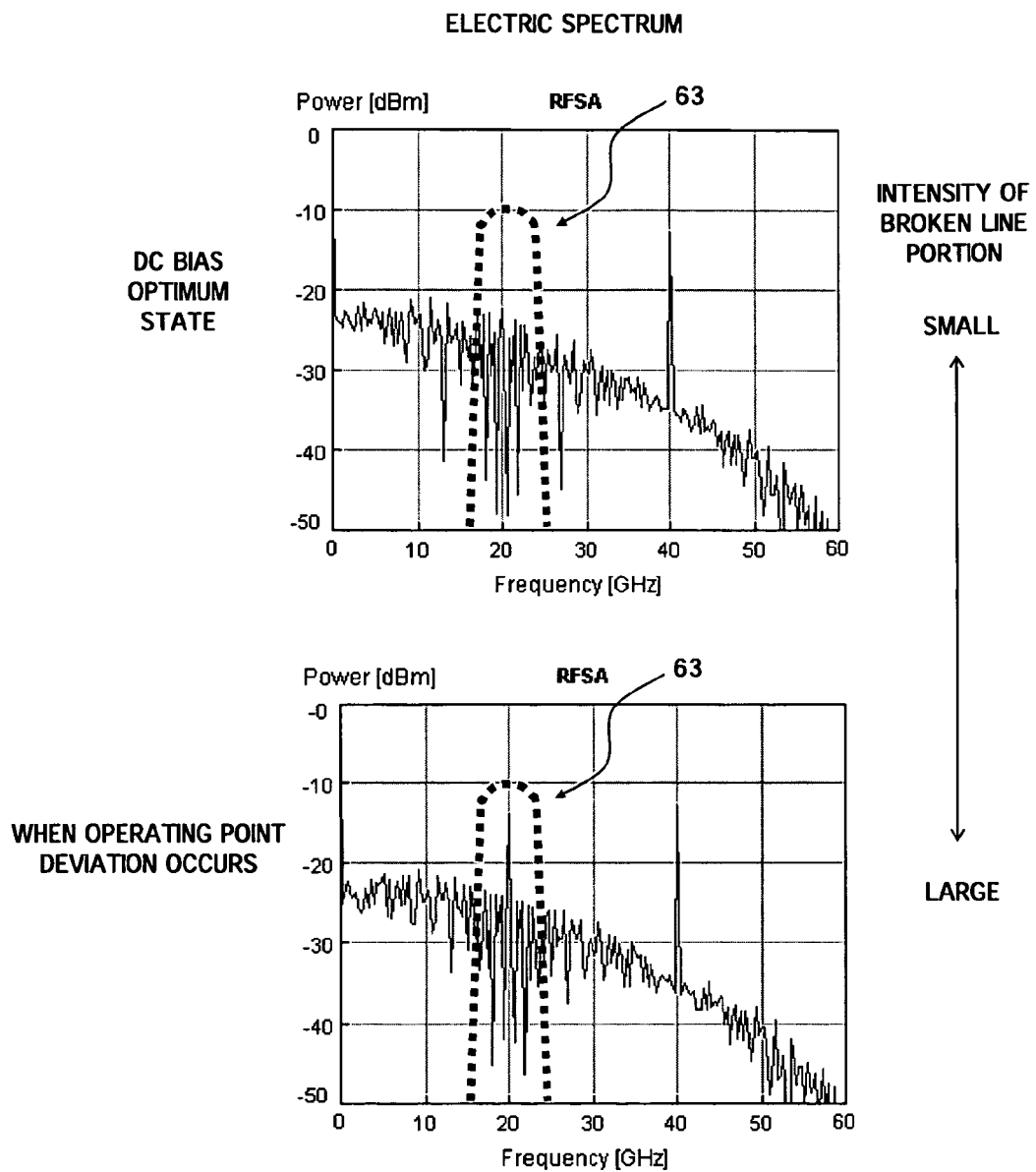
FIG. 16 is a diagram for explaining a detection operation of operating point deviation in the fourth embodiment.

Specifically, in the case where the electric spectrum corresponding to the CS-RZ signal light of 40 Gb/s exemplified in FIG. 15 can be obtained by the light receiving circuit 62, then as shown by the broken line portion in FIG. 16, the central frequency of a transmission band of the electric filter 63 is set, to match with the 20 GHz being the frequency of the clock signals CLK1 and CLK2. As is also apparent from FIG. 16, the closer the operating point comes to the optimum point, the more the intensity of the frequency component extracted by this electric filter 63 is decreased. Therefore, the setting of the operation of the bias supply circuit 27 is feedback controlled so that the intensity measured by the electric power sensor 64 becomes a minimum. Thus, it becomes possible to optimize the operating point of the LN modulator 20.

Furthermore, in the control circuit 70, it is also possible to detect a minimum value of the intensity measured by the electric power sensor 64 by applying a well-known processing such as the dithering, to thereby detect the traveling direction of the operating point deviation. If in this manner, the traveling direction of the operating point deviation is detected and the DC bias is feedback controlled, the operating point of the LN modulator 20 can be compensated at higher speed.

As described above, according to the fourth embodiment, for the LN modulator 20 driven by the clock signals CLK1 and CLK2 of B/2 (Hz), the intensity change in the frequency component with the center of B/2 (Hz) of the electric spectrum of the output light is monitored. Therefore, the generation condition of the operating point deviation can be reliably detected, to feedback control the DC bias. As a result, it becomes possible to realize the operating point compensation for the modulator driven with the voltage amplitude of $2V\pi$, which has been difficult in the conventional system in which the low frequency signal is superimposed on the drive signal for compensating for the operating point. Thus, it becomes possible to generate the CS-RZ signal light in a stable drive condition.

Next is a description of a fifth embodiment of the control apparatus for the optical modulator according to the present invention.

In the above described fourth embodiment, the description has been made on the case where the operating point is compensated, paying attention to the change in the electric spectrum in the change characteristic of the output light due to the operating point deviation shown in FIG. 15. In the fifth embodiment, the description is for the case where the operating point is compensated, paying attention to a change in the optical spectrum in the change characteristic of the output light.

Figure 17:
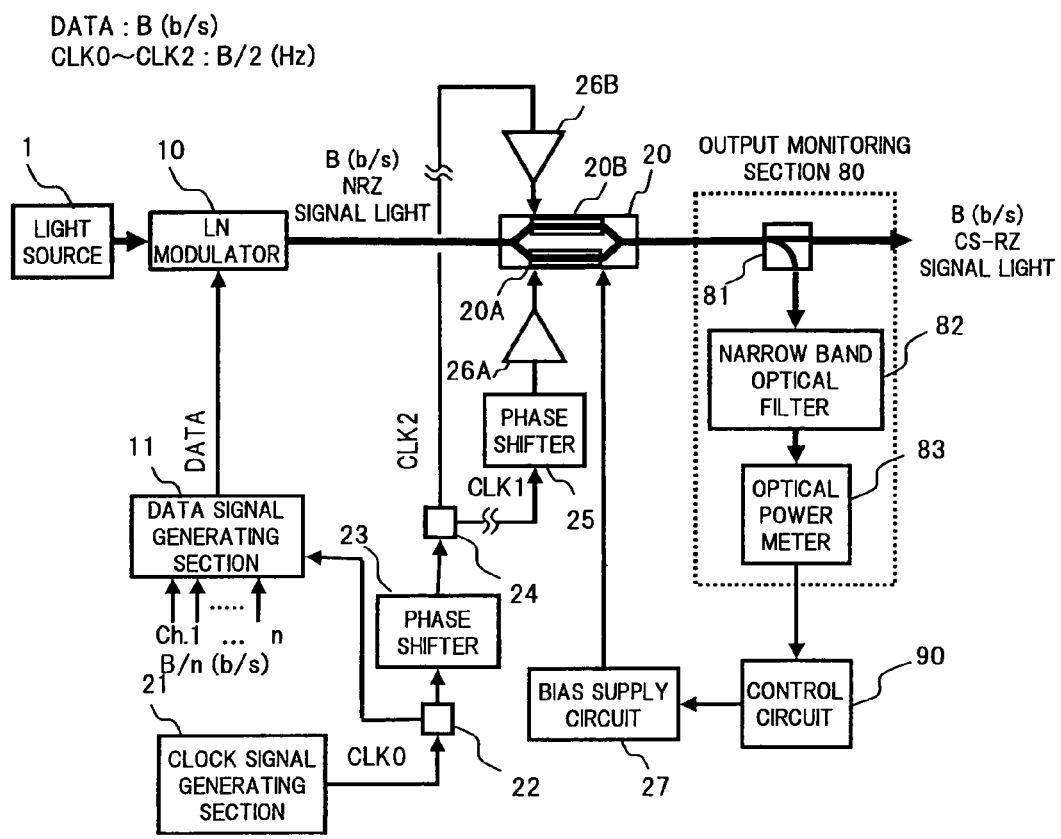
FIG. 17 is a block diagram showing a configuration of a fifth embodiment of the present invention.

FIG. 17 is a block diagram showing a configuration of the control apparatus for the optical modulator according to the fifth embodiment In FIG. 17, the constitution of the present embodiment differs from that of the fourth embodiment shown in FIG. 14 described above, in that, instead of the output monitoring section 60 and the control circuit 70, there are provided: an output monitoring section 80 that branches a part of the signal light output from the latter stage LN modulator 20 as a monitor light, extracts the central optical frequency component, and monitors the optical power of the central optical frequency component; and a control circuit 90 judging the operating point deviation of the LN modulator 20, to feedback controls the bias supply circuit 27, based on a change in the optical power of the central optical frequency component monitored by the output monitoring section 80. Other components are similar to those of the fourth embodiment The output monitoring section 80 includes, for example, an optical coupler 81, a narrow band optical filter 82, and an optical power meter 83. The optical coupler 81 branches a part of the CS-RZ signal light output from the latter stage LN modulator 20 as a monitor light, to send the branched light to the narrow band optical filter 82. The narrow band optical filter 82 has a filter characteristic in which the bandwidth of the transmission band is sufficiently narrow, and extracts only the central optical frequency component from the monitor light branched by the optical coupler 81. The optical power meter 83 measures the power of the monitor light extracted by the narrow band optical filter 82 and outputs the measurement result to the control circuit 90.

The control circuit 90 feedback controls the setting of the operation of the bias supply circuit 27 so that the power of the monitor light measured by the optical power meter 83 becomes a minimum. This feedback control is performed based on a change in a carrier component corresponding to the central optical frequency, which is generated in the output optical spectrum due to the operating point deviation as shown in FIG. 15. This carrier component of the central optical frequency is generated as a result that the symmetry property of the dual system clock signals CLK1 and CLK2 given to the respective electrodes 20A and 20B of the LN modulator 20 is fractured and the carrier suppression is not performed.

Figure 18:
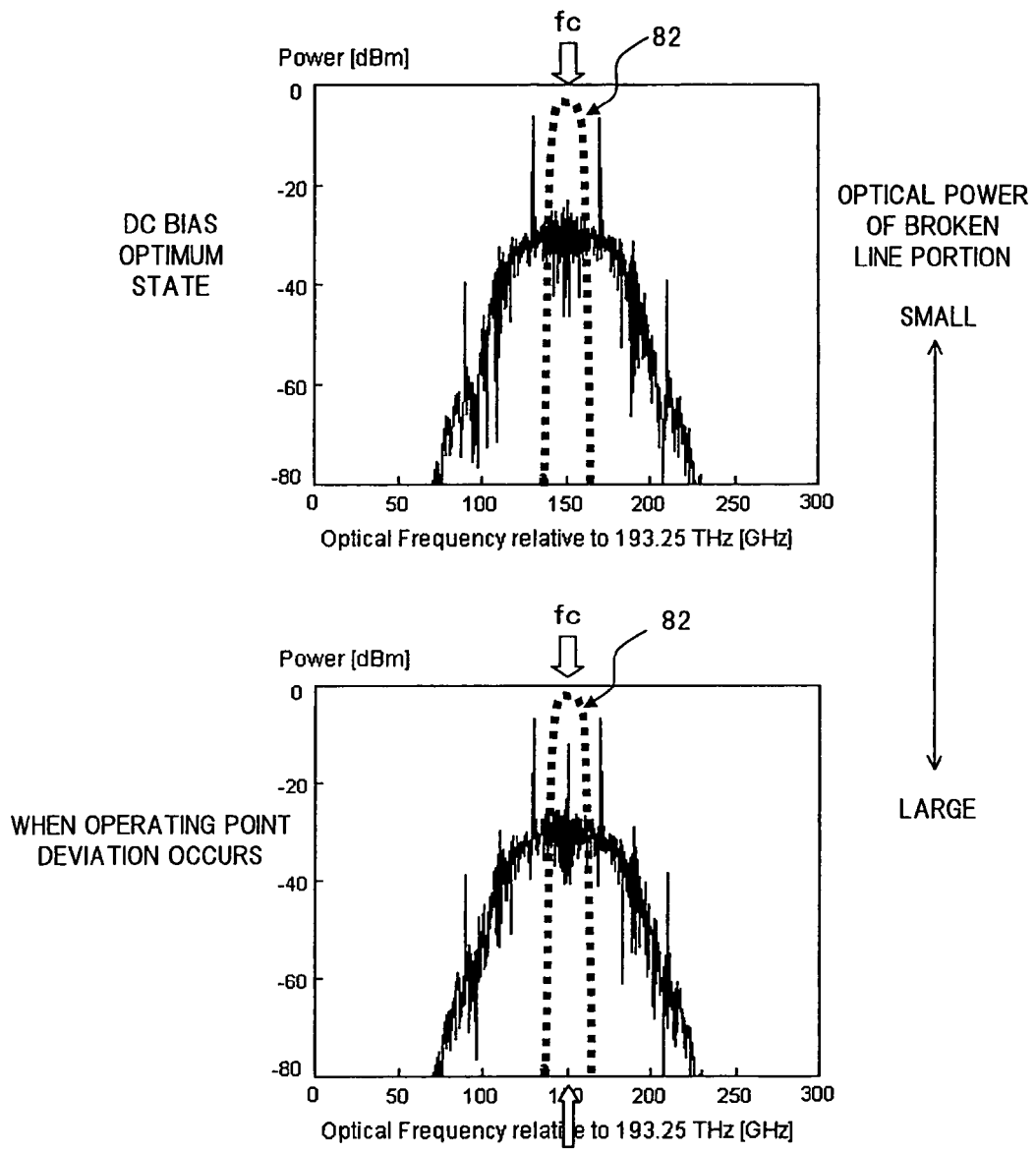
FIG. 18 is a diagram for explaining a detection operation of operating point deviation in the fifth embodiment.

Specifically, in the case where a part of the CS-RZ signal light of 40 Gb/s having the optical spectrum exemplified at the bottom right in FIG. 15 is branched as a monitor light by the optical coupler 81, then as shown by the broken line portion in FIG. 18, the central optical frequency of the transmission band of the narrow band optical filter 82 is set to match with the central optical frequency fc of the optical spectrum of the CS-RZ signal light. As is also apparent from FIG. 18, the closer the operating point comes to the optimum point, the more the optical power of the optical frequency component extracted by this narrow band optical filter 82 is decreased. Therefore, the setting of the operation of the bias supply circuit 27 is feedback controlled so that the optical power measured by the optical power meter 83 becomes a minimum. Thus, it becomes possible to optimize the operating point of the LN modulator 20.

Furthermore, in the control circuit 90, a minimum value of the optical power measured by the optical power meter 83 is detected by applying a well-known processing such as the dithering. Thus, it is possible to detect the traveling direction of the operating point deviation. If in this manner, the traveling direction of the operating point deviation is detected, to feedback control the DC bias, the operating point of the LN modulator 20 can be compensated at higher speed.

As described above, according to the fifth embodiment, for the LN modulator 20 driven by the clock signals CLK1 and CLK2 of B/2 (Hz), the change in the optical power of the carrier component generated at the central optical frequency of the output optical spectrum is also monitored. Therefore, the occurrence condition of the operating point deviation can be reliably detected, to feedback control the DC bias. As a result, the operating point compensation for the modulator driven with the voltage amplitude of $2V\pi$ can be realized. Thus, it becomes possible to generate the CS-RZ signal light in a stable drive condition.

Figure 19:
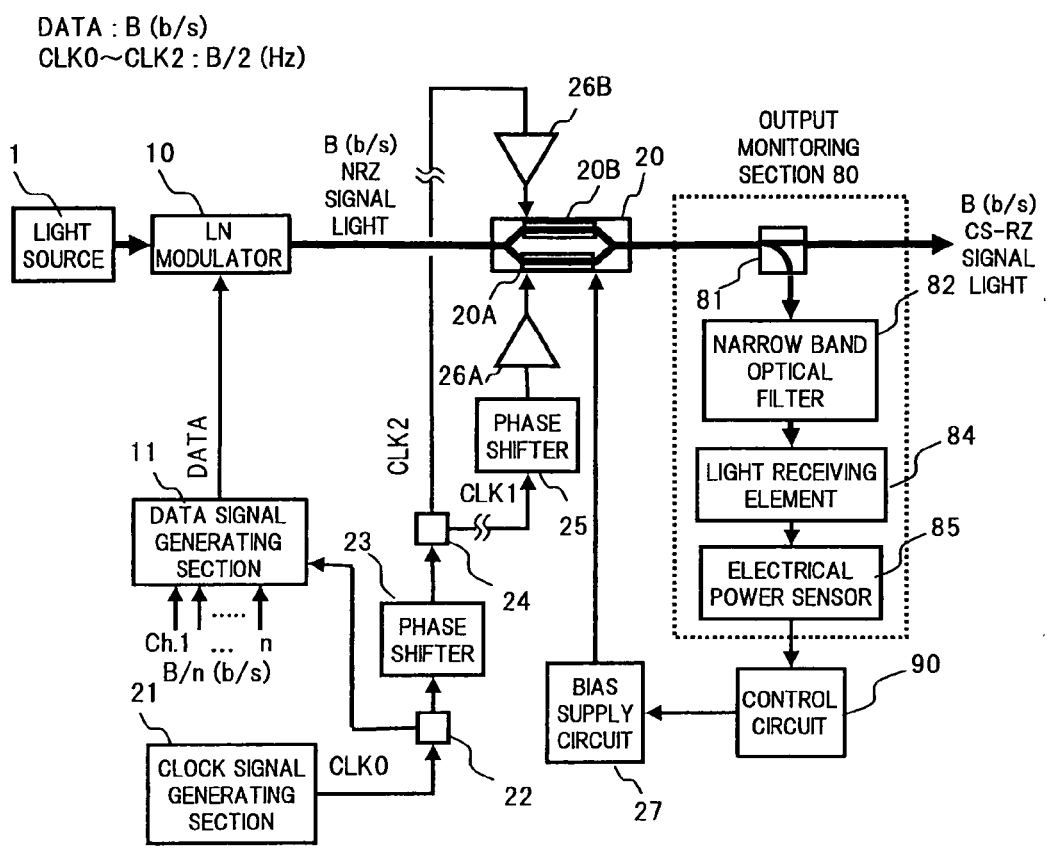
FIG. 19 is a block diagram showing another configuration example related to the fifth embodiment.

In the above described fifth embodiment, the configuration example has been shown in which the optical power of the central optical frequency component extracted by the narrow band optical filter 82, is measured by the optical power meter 83. However, for example as shown in FIG. 19, it is also possible to provide a light receiving element 84 and an electric power sensor 85 instead of the optical power meter 83, to measure the optical power of the central optical frequency component Furthermore, in the above described first through fifth embodiments, an example has been shown in which the individual components are connected in series as the former and latter stage LN modulators 10 and 20. However, for example, the former and latter stage LN modulators 10 and 20 may be continuously formed on the same substrate, for example.

Moreover, for the above described first through fifth embodiments, it is also possible to appropriately combine the respective components, to concurrently perform any two or more compensations from among: the compensation of the phase shift between the data signal driving the former stage LN modulator 10 and the clock signals driving the latter stage LN modulator 20: the compensation of the phase shift between the dual system clock signals driving the latter stage LN modulator 20, and the compensation of the operating point of the latter stage LN modulator 20. Hereunder are specific embodiments related to the above described combinations.

Figure 20:
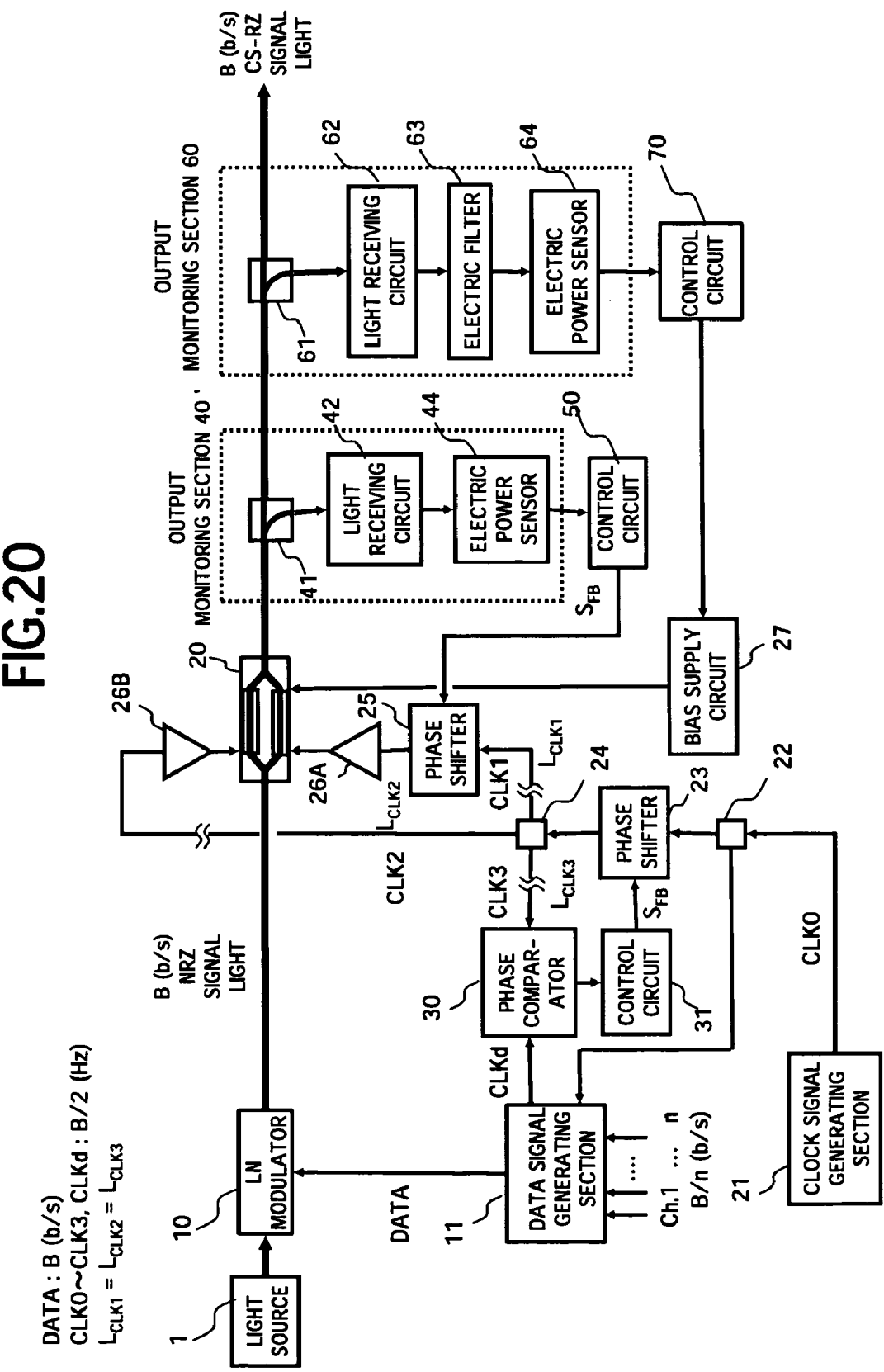
FIG. 20 is a block diagram showing an embodiment in which the configurations of the first, third and fourth embodiments are combined.

FIG. 20 is a block diagram showing an embodiment of the control apparatus for the optical modulator, in which the configurations of the first, third and fourth embodiments are combined. In the configuration of this embodiment, the following compensations are concurrently performed, namely: the compensation of the phase shift between the data signal and the clock signals realized by the feedback control of the phase shifter 23 by the phase comparator 30 and the control circuit 31; the compensation of the phase shift between the clock signals CLK1 and CLK2 realized by the feedback control of the phase shifter 25 by the output monitoring section 40' and the control circuit 50; and the compensation of the operating point of the latter stage LN modulator 20 realized by the feedback control of the bias supply circuit 27 based on the electric spectrum of the output light, by the output monitoring section 60 and the control circuit 70.

Figure 21:
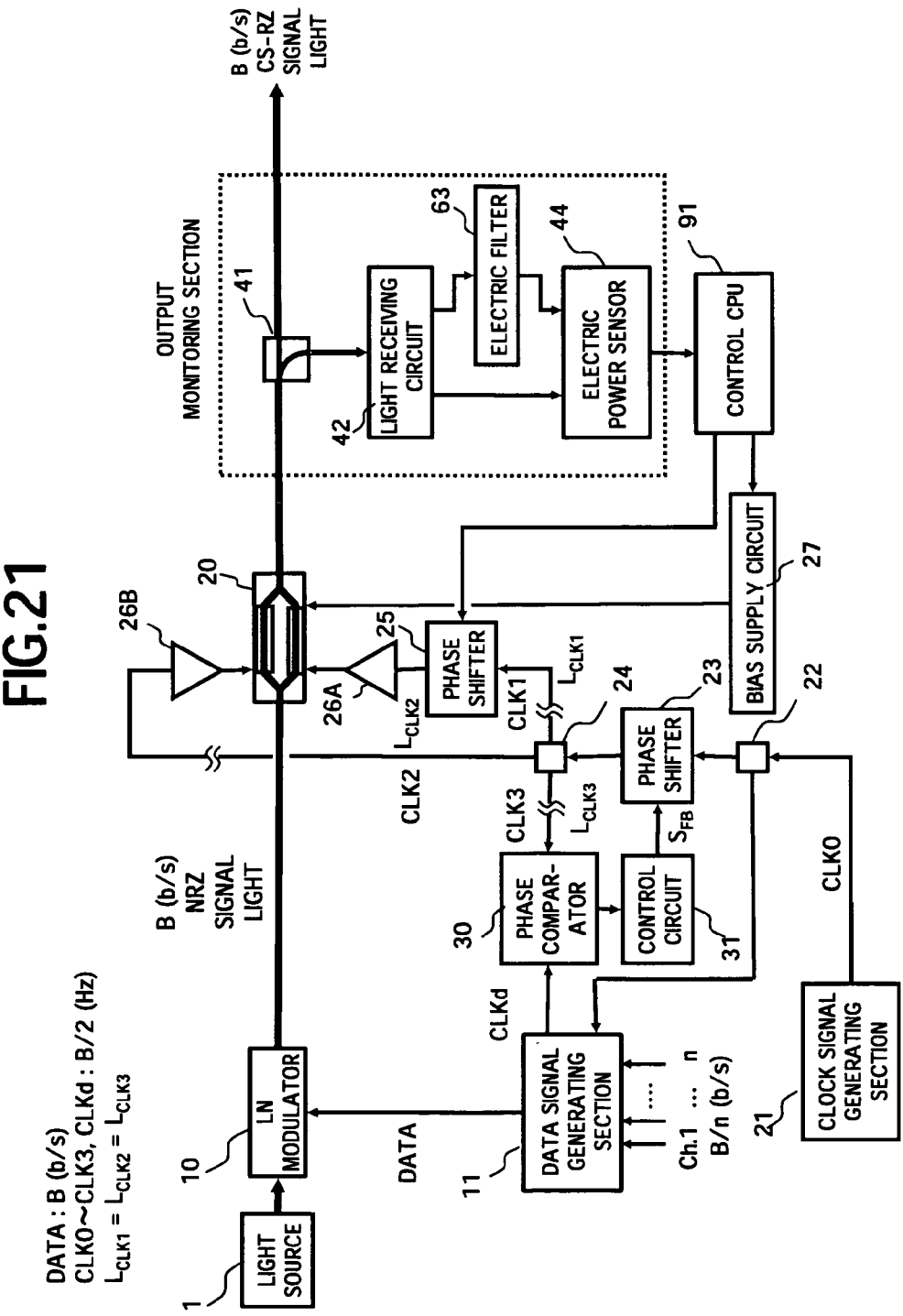
FIG. 21 is a block diagram showing an application example related to the embodiment of FIG. 19.

Furthermore, for the configuration of the embodiment shown in FIG. 20, it is also possible to simplify the configuration, for example as shown in FIG. 21, by making common the optical coupler 41, the light receiving circuit 42, and the electric power sensor 44 in the output monitoring section 40', and the optical coupler 61, the light receiving circuit 62, and the electric power sensor 64 in the output monitoring section 60, and providing a control CPU 91 equipped with the functions of both the control circuits 50 and 70.

Figure 22:
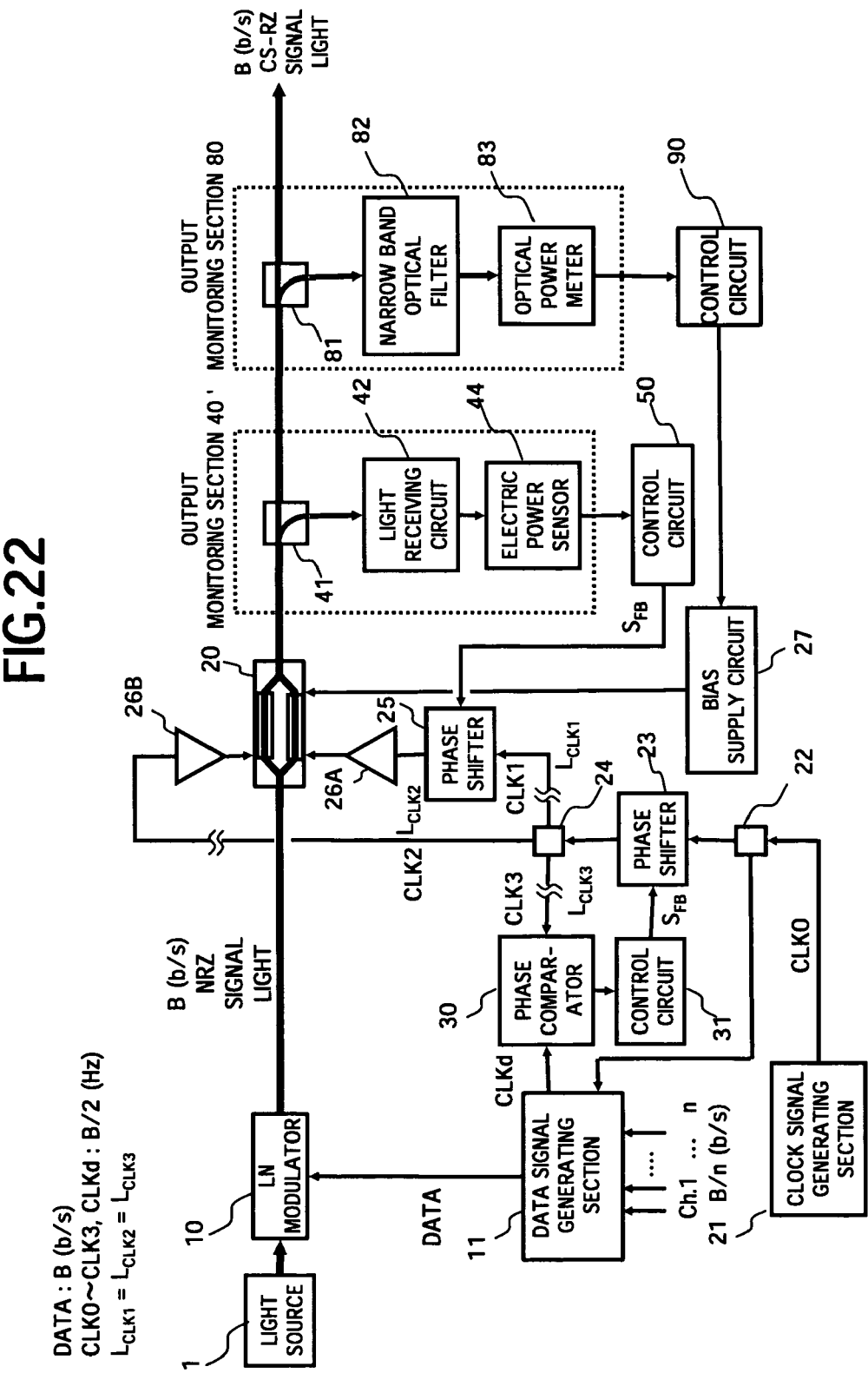
FIG. 22 is a block diagram showing an embodiment in which the configurations of the first, third and fifth embodiments are combined

FIG. 22 is a block diagram showing an embodiment of the control apparatus for the optical modulator, in which the configurations of the first, third and fifth embodiments are combined. In the configuration of this embodiment, the following compensations are concurrently performed, namely: the compensation of the phase shift between the data signal and the clock signals realized by the feedback control of the phase shifter 23 by the phase comparator 30 and the control circuit 31; the compensation of the phase shift between the clock signals CLK1 and CLK2 realized by the feedback control of the phase shifter 25 by the output monitoring section 40' and the control circuit 50; and the compensation of the operating point of the latter stage LN modulator 20 realized by the feedback control of the bias supply circuit 27 based on the optical spectrum of the output light, by the output monitoring section 80 and the control circuit 90.

Figure 23:
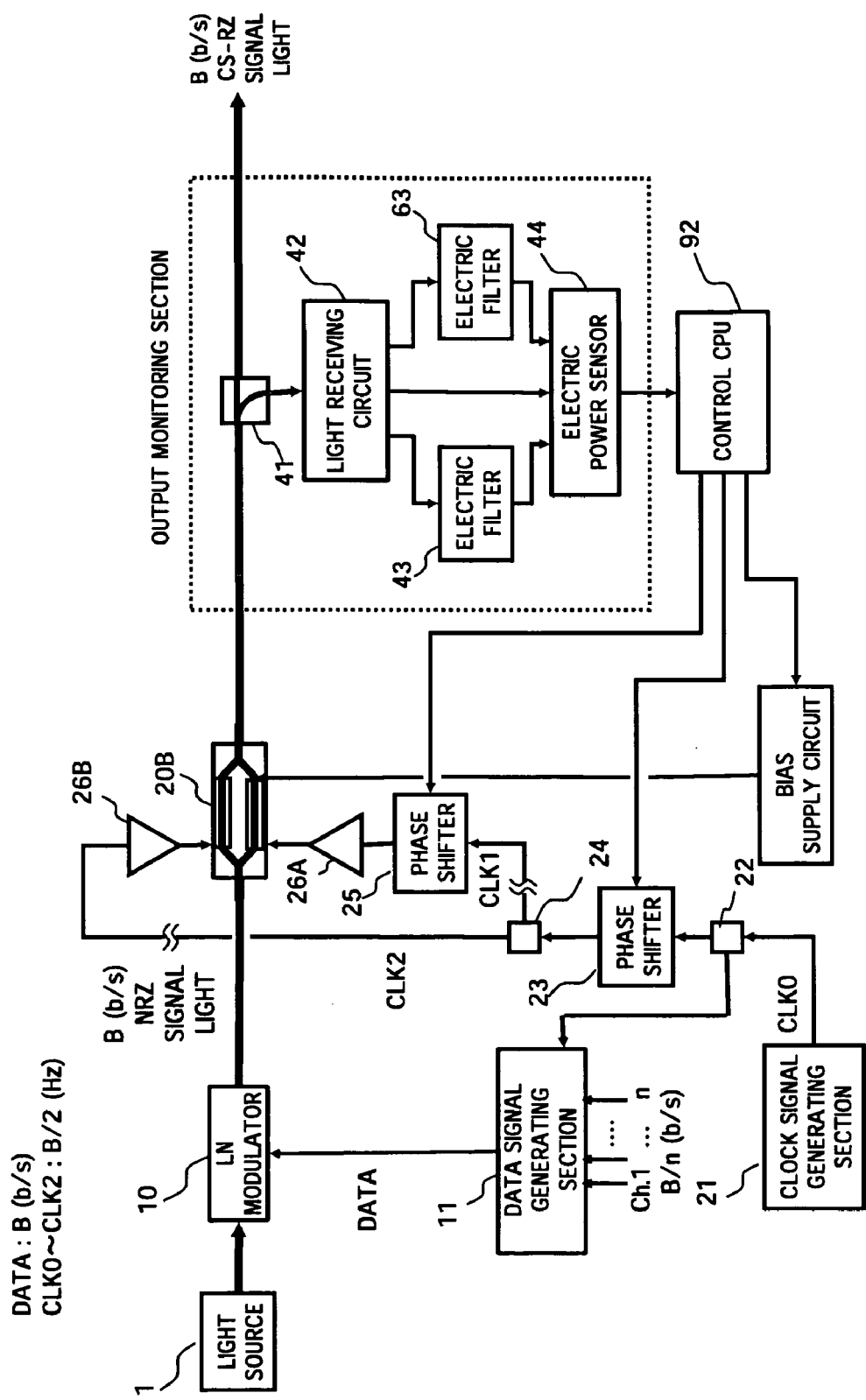
FIG. 23 is a block diagram showing an embodiment in which the configurations of the second, third and fourth embodiments are combined.

FIG. 23 is a block diagram showing an embodiment of the control apparatus for the optical modulator, in which the configurations of the second, third and fourth embodiments are combined. In this combination, since the respective compensations are performed based on the electric spectrum of the output light, it is possible to simplify the configuration by making common the optical coupler, the optical receiving circuit, and the electric power sensor in the output monitoring section corresponding to each of the compensations, so that a control CPU 92 feedback controls the phase shifters 23 and 25, and the bias supply circuit 27, respectively, based on the measurement result by the electric power sensor.

Figure 24:
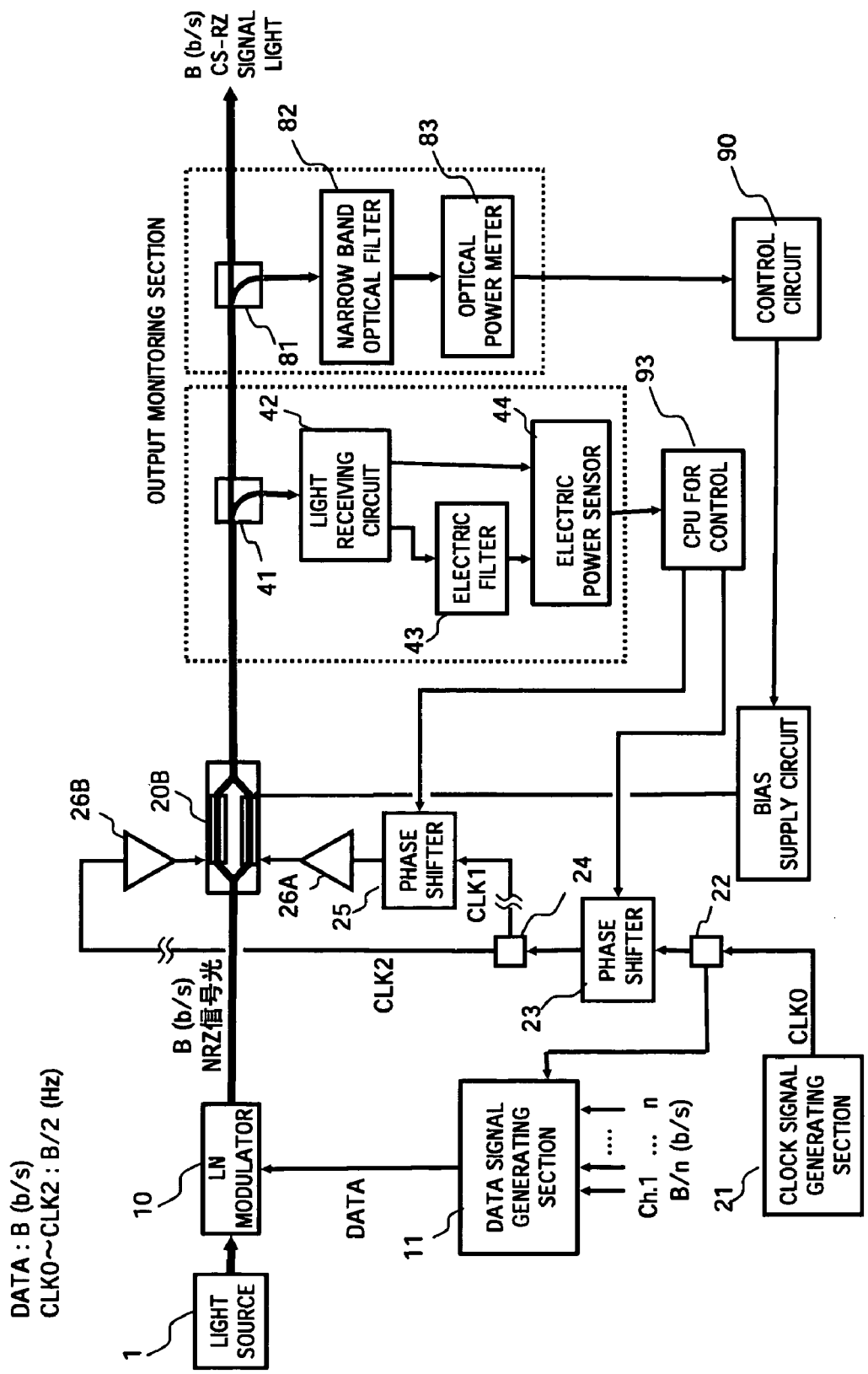
FIG. 24 is a block diagram showing an embodiment in which the configurations of the second, third and fifth embodiments are combined.
Figure 25:
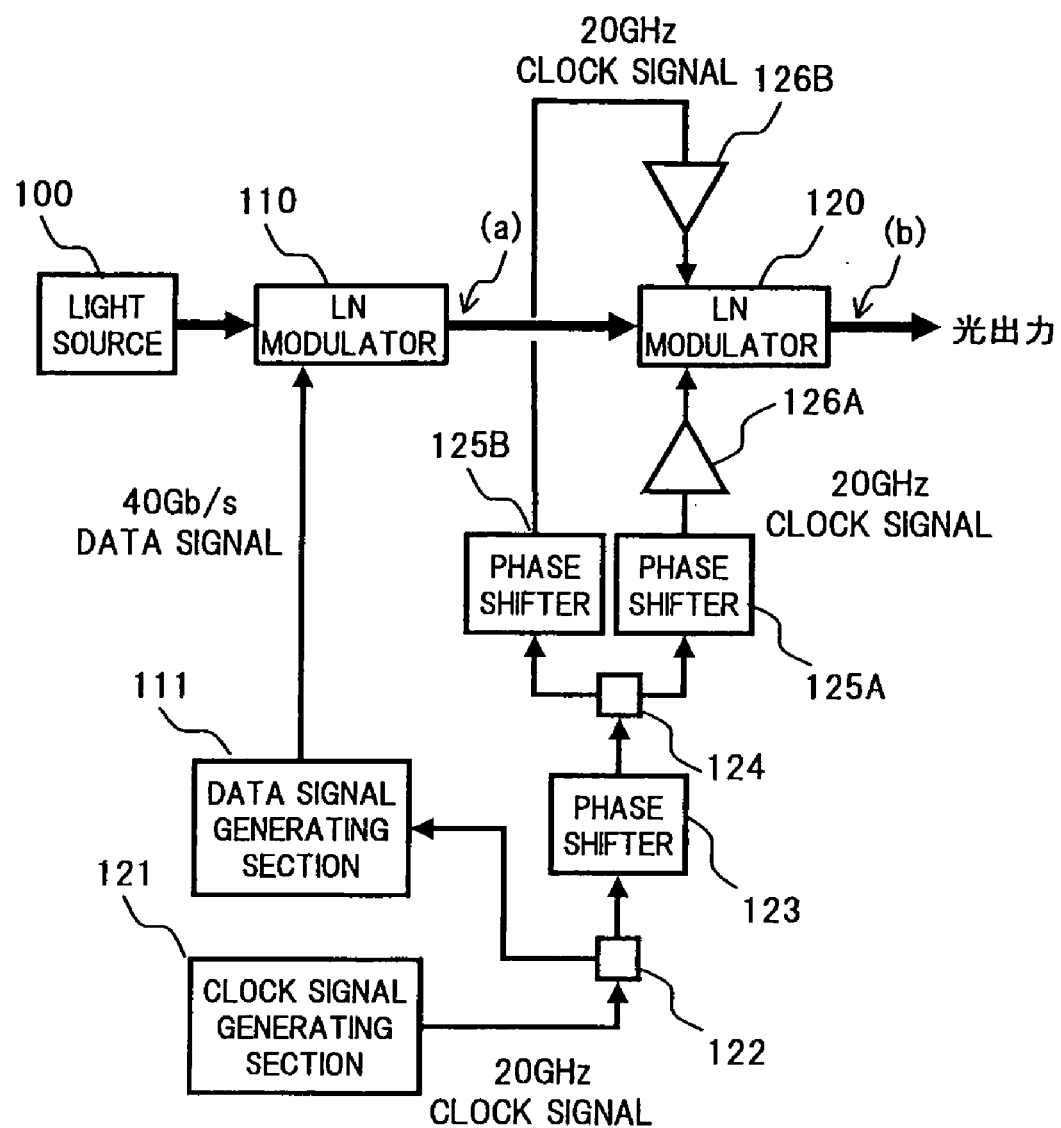
FIG. 25 shows a basic configuration of a conventional CS-RZ modulation optical modulator.
Figure 26:
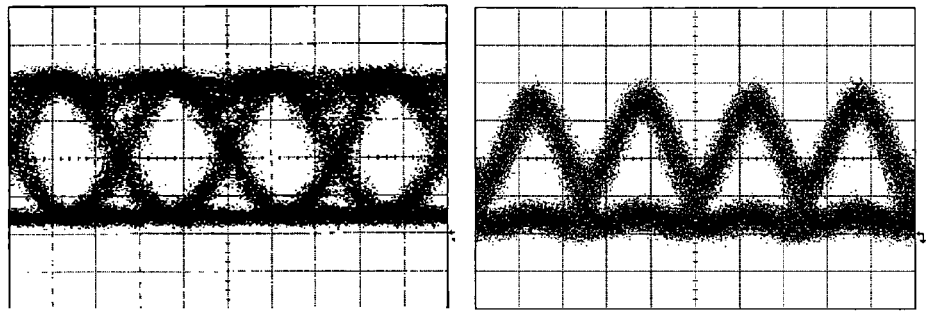
FIG. 26 shows examples of waveforms of signal light generated in the basic configuration of FIG. 25.

FIG. 24 is a block diagram showing an embodiment of the control apparatus for the optical modulator, in which the configurations of the second, third and fifth embodiments are combined. In the configuration of this embodiment, the change in the electric spectrum of the output light is monitored by the output monitoring section in which the optical coupler, the optical receiving circuit, and the electric power sensor are made common, and a control CPU 93 feedback controls the phase shifters 23 and 25, respectively, based on the monitoring result. As a result, the phase shift between the data signal and the clock signals, and the phase shift between the clock signals CLK1 and CLK2 are compensated. Moreover, at the same time, by the feedback control of the bias supply circuit 27 based on the optical spectrum of the output light by the output monitoring section 80 and the control circuit 90, the operating point of the latter stage LN modulator 20 is compensated.

The above described configurations shown in FIG. 20 through FIG. 24 show preferable specific examples of combinations of the above described first through fifth embodiments. Similarly to these, it is of course possible to configure a control apparatus for an optical modulator by other combinations.

What is claimed is:

1. A control apparatus for an optical modulator that comprises:

an optical modulation section including a part for branching an optical waveguide into a first branch optical waveguide and a second branch optical waveguide, and a part for combining said first and second branch optical waveguides, and utilizing a first electrode and a second electrode respectively provided in said first and second branch optical waveguides to control refractive indexes of said first and second branch optical waveguides, and obtaining a periodic optical intensity characteristic according to a difference between the refractive indexes;

a drive section that gives a drive signal to at least one of said first and second electrodes so that said optical modulation section performs a modulating operation corresponding to one period of the optical intensity characteristic thereof; and a bias supply section that supplies a DC bias to said optical modulation section to adjust an operating point, wherein said control apparatus comprises:

an output monitoring section that detects a change in the signal light output from said optical modulation section, wherein said output monitoring section acquires the optical spectrum of a signal light output from said optical modulation section, and extracts from said optical spectrum an optical frequency component matched to the central optical frequency of said signal light, to detect an optical power of said optical frequency component; and a control section that judges the operating point deviation of said optical modulation section according to the optical power detected by said output monitoring section, and controls said bias supply section so as to minimize said operating point deviation.

2. A control method for an optical modulator that comprises:

an optical modulation section including a part for branching an optical waveguide into a first branch optical waveguide and a second branch optical waveguide, and a part for combining said first and second branch optical waveguides, and utilizing a first electrode and a second electrode respectively provided in said first and second branch optical waveguides to control refractive indexes of said first and second branch optical waveguides, and obtaining a periodic optical intensity characteristic according to a difference between the refractive indexes;

a drive section that gives a drive signal to at least one of said first and second electrodes so that said optical modulation section performs a modulating operation corresponding to one period of the optical intensity characteristic thereof; and a bias supply section that supplies a DC bias to said optical modulation section to adjust an operating point, wherein said control method comprises:

detecting a change in the signal light output from said optical modulation section, by acquiring the optical spectrum of a signal light output from said optical modulation section, and extracting from said optical spectrum an optical frequency component matched to the central optical frequency of said signal light, to detect an optical power of said optical frequency component;

judging the operating point deviation of said optical modulation section according to the detected optical power of said optical frequency component; and controlling said bias supply section so as to minimize said operating point deviation.

3. A control apparatus for an optical modulator that comprises:

an optical modulation section including a branched optical waveguide;

a drive section that provides a drive signal to the optical modulation section; and a bias supply section that supplies a bias to the optical modulation section to adjust an operating point, wherein said control apparatus comprises:

an output monitoring section that detects a change in the signal light output from the optical modulation section, wherein the output monitoring section acquires the optical spectrum of a signal light output from the optical modulation section, and extracts from the optical spectrum an optical frequency component matched to the central optical frequency of the signal light, to detect an optical power of the optical frequency component; and a control section that judges the operating point deviation of the optical modulation section according to the optical power detected by the output monitoring section, and controls the bias supply section so as to minimize the operating point deviation.

* * * * *